US012676705B2

(12) United States Patent　　　　　(10) Patent No.:　US 12,676,705 B2
Kiilerich Pratas et al.　　　　　　(45) Date of Patent:　　　Jul. 7, 2026

(54) METHOD AND APPARATUS USING RESOURCE ALLOCATION SLOT AGGREGATION ASPECTS FOR DETERMINING SLOTS TO SENSE AND TO INCLUDE IN A RESOURCE SET

(71) Applicant: Nokia Technologies Oy, Espoo (FI)

(72) Inventors: Nuno Manuel Kiilerich Pratas, Gistrup (DK); Thomas Haaning Jacobsen, Nørresundby (DK); Faranaz Sabouri-Sichani, Aalborg (DK); Vinh Van Phan, Oulu (FI); Ling Yu, Kauniainen (FI); Torsten Wildschek, Gloucester (GB)

(73) Assignee: Nokia Technologies Oy, Espoo (FI)

( * ) Notice: Subject to any disclaimer, the term of this patent is extended or adjusted under 35 U.S.C. 154(b) by 687 days.

(21) Appl. No.: 18/111,004

(22) Filed: Feb. 17, 2023

(65) Prior Publication Data

US 2024/0283583 A1　　Aug. 22, 2024

(51) Int. Cl.
　　*H04W 74/0808*　　(2024.01)
　　*H04L 5/00*　　(2006.01)
　　　　(Continued)

(52) U.S. Cl.
　　CPC .......... *H04L 5/001* (2013.01); *H04L 12/4035* (2013.01); *H04L 27/26025* (2021.01);
　　　　(Continued)

(58) Field of Classification Search
　　CPC . H04W 74/08; H04W 74/0808; H04W 28/26; H04W 72/0446; H04L 12/4035;
　　　　(Continued)

(56) References Cited

U.S. PATENT DOCUMENTS

2022/0312479 A1*　9/2022　Farag ..................... H04W 72/02
2023/0083277 A1*　3/2023　Lee ........................ H04W 72/02
　　　　　　　　　　　　　　　　　　370/329

(Continued)

FOREIGN PATENT DOCUMENTS

WO　　WO-2022/265388 A　　12/2022
WO　　WO-2022/265397 A　　12/2022

OTHER PUBLICATIONS

3GPP, "TS 38.214 v17.4.0", Jan. 2023, pp. 1-236 (Year: 2023).*

(Continued)

*Primary Examiner* — Salvador E Rivas
(74) *Attorney, Agent, or Firm* — Robert P. Michal, Esq.; Rimon PC

(57) ABSTRACT

An apparatus comprising circuitry configured to: determine whether a resource pool of a group of time slots associated with a first carrier spacing overlaps with a resource pool of a frame associated with a second carrier spacing within a period of time; wherein the first carrier spacing has a higher frequency than the second carrier spacing, and the period of time comprises the group of time slots associated with the first carrier spacing and the frame associated with the second carrier spacing; and perform sensing of at least one time slot of the group of time slots, based on whether the resource pool of the group of time slots associated with the first carrier spacing overlaps with the resource pool of the frame associated with the second carrier spacing within the period of time.

13 Claims, 17 Drawing Sheets

1200

1210 — determining whether a resource pool of a group of time slots associated with a first carrier spacing overlaps with a resource pool of a frame associated with a second carrier spacing within a period of time 1220 — wherein the first carrier spacing has a higher frequency than the second carrier spacing, and the period of time comprises the group of time slots associated with the first carrier spacing and the frame associated with the second carrier spacing 1230 — performing sensing of at least one time slot of the group of time slots, based on whether the resource pool of the group of time slots associated with the first carrier spacing overlaps with the resource pool of the frame associated with the second carrier spacing within the period of time

(51) Int. Cl.
    *H04L 12/403*      (2006.01)
    *H04L 27/26*      (2006.01)
    *H04W 72/0446*      (2023.01)
    *H04B 17/382*      (2015.01)
    *H04L 25/03*      (2006.01)
    *H04W 28/26*      (2009.01)

(52) U.S. Cl.
    CPC ... *H04W 72/0446* (2013.01); *H04W 74/0808*
    (2013.01); *H04B 17/382* (2015.01); *H04L*
    *25/03012* (2013.01); *H04L 27/2671* (2013.01);
    *H04W 28/26* (2013.01)

(58) Field of Classification Search
    CPC .......... H04L 25/03012; H04L 27/2671; H04B
    17/382
    See application file for complete search history.

(56) References Cited

U.S. PATENT DOCUMENTS

| | | | |
|---|---|---|---|
| 2023/0308886 A1* | 9/2023 | Jeon | H04W 4/38 |
| 2023/0345423 A1* | 10/2023 | Dong | H04W 72/02 |
| 2024/0032075 A1* | 1/2024 | Ye | H04W 72/40 |
| 2024/0276463 A1* | 8/2024 | Hwang | H04W 72/25 |

OTHER PUBLICATIONS

3GPP TS 38.212 V17.4.0 $3^{rd}$ Generation Partnership Project; Technical Specification Group Radio Access Network; NR; Multiplexing and Channel Coding (Release 17) Dec. 2022.

* cited by examiner

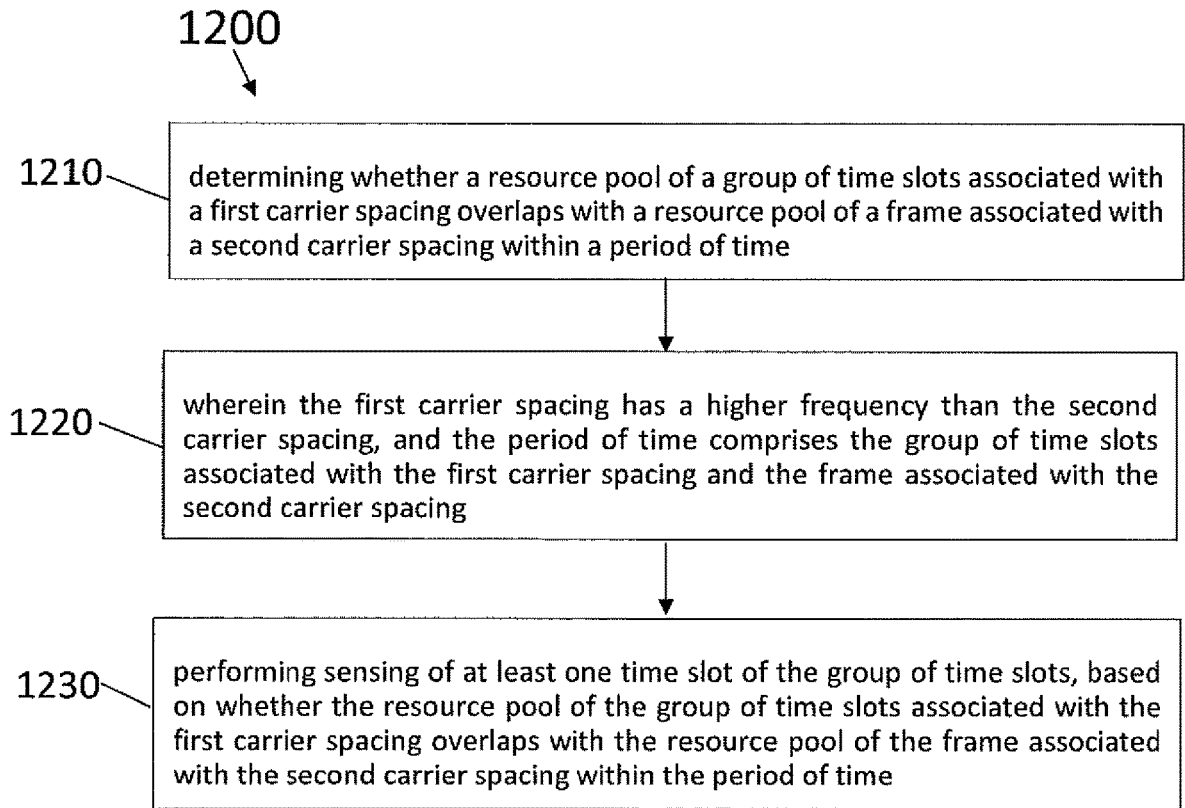

1200

1210 — determining whether a resource pool of a group of time slots associated with a first carrier spacing overlaps with a resource pool of a frame associated with a second carrier spacing within a period of time 1220 — wherein the first carrier spacing has a higher frequency than the second carrier spacing, and the period of time comprises the group of time slots associated with the first carrier spacing and the frame associated with the second carrier spacing 1230 — performing sensing of at least one time slot of the group of time slots, based on whether the resource pool of the group of time slots associated with the first carrier spacing overlaps with the resource pool of the frame associated with the second carrier spacing within the period of time

FIG. 12

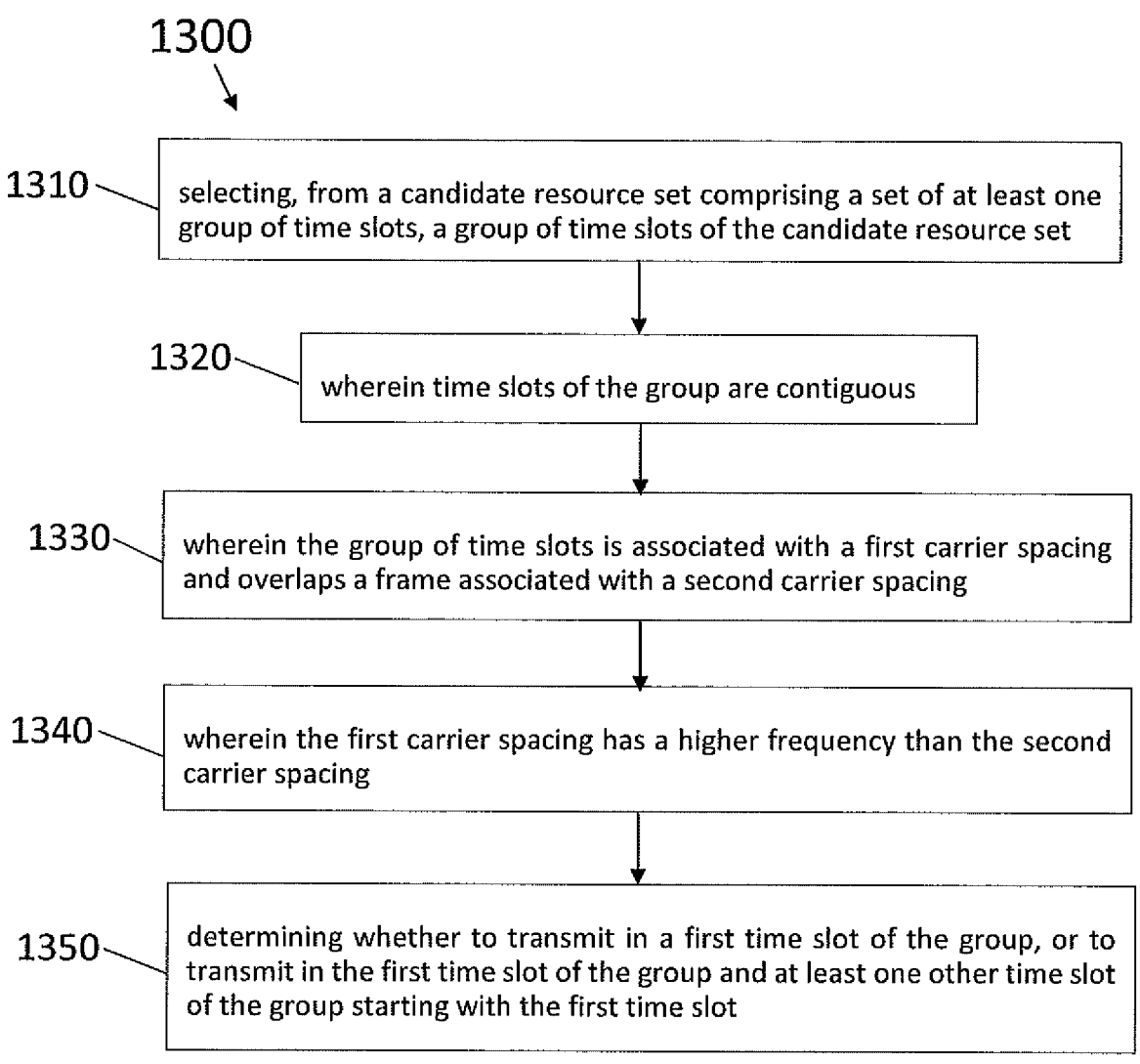

1300

1310 — selecting, from a candidate resource set comprising a set of at least one group of time slots, a group of time slots of the candidate resource set 1320 — wherein time slots of the group are contiguous 1330 — wherein the group of time slots is associated with a first carrier spacing and overlaps a frame associated with a second carrier spacing 1340 — wherein the first carrier spacing has a higher frequency than the second carrier spacing 1350 — determining whether to transmit in a first time slot of the group, or to transmit in the first time slot of the group and at least one other time slot of the group starting with the first time slot

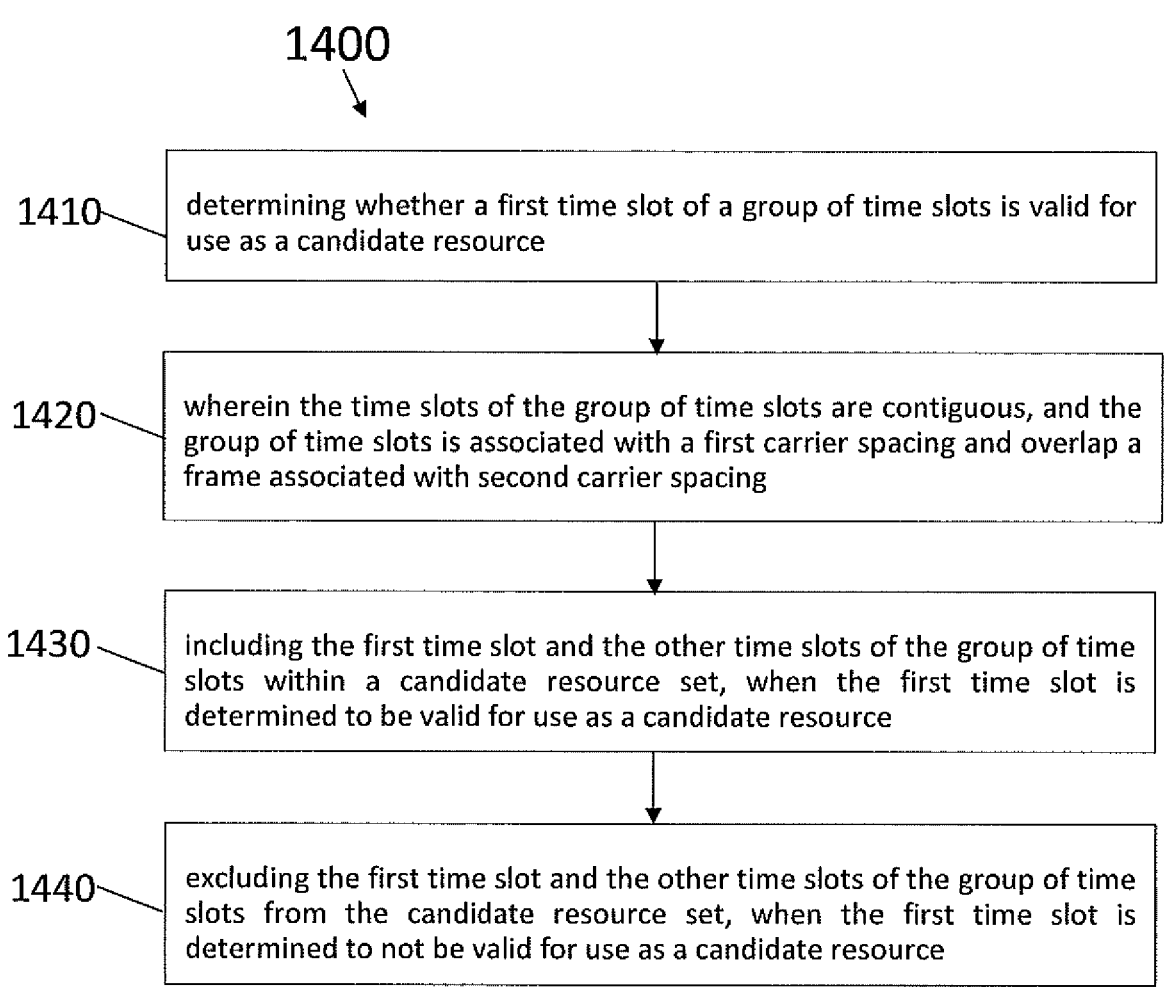

1410 — determining whether a first time slot of a group of time slots is valid for use as a candidate resource 1420 — wherein the time slots of the group of time slots are contiguous, and the group of time slots is associated with a first carrier spacing and overlap a frame associated with second carrier spacing 1430 — including the first time slot and the other time slots of the group of time slots within a candidate resource set, when the first time slot is determined to be valid for use as a candidate resource 1440 — excluding the first time slot and the other time slots of the group of time slots from the candidate resource set, when the first time slot is determined to not be valid for use as a candidate resource

FIG. 14

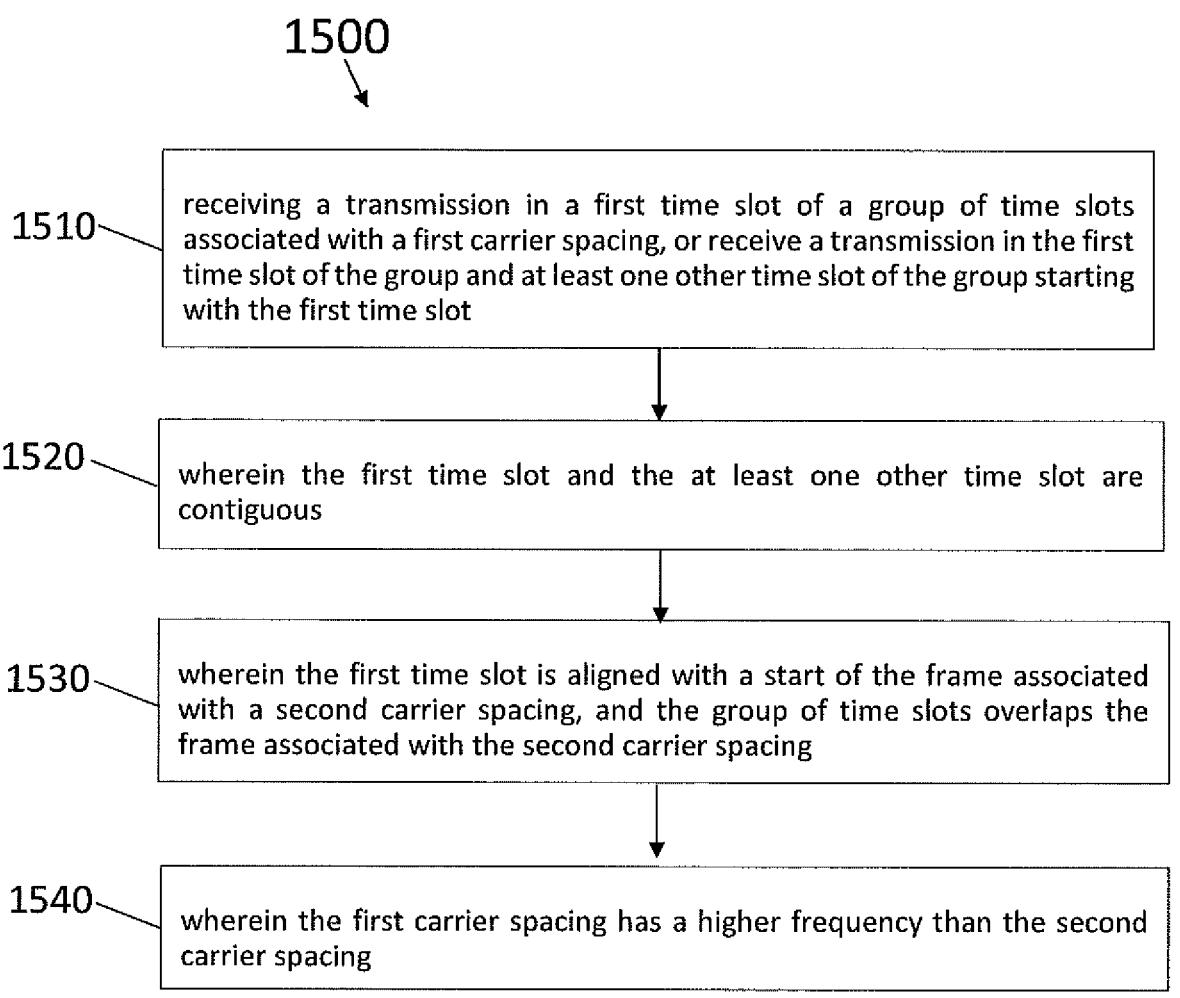

1500

1510 — receiving a transmission in a first time slot of a group of time slots associated with a first carrier spacing, or receive a transmission in the first time slot of the group and at least one other time slot of the group starting with the first time slot 1520 — wherein the first time slot and the at least one other time slot are contiguous 1530 — wherein the first time slot is aligned with a start of the frame associated with a second carrier spacing, and the group of time slots overlaps the frame associated with the second carrier spacing 1540 — wherein the first carrier spacing has a higher frequency than the second carrier spacing

FIG. 15

METHOD AND APPARATUS USING RESOURCE ALLOCATION SLOT AGGREGATION ASPECTS FOR DETERMINING SLOTS TO SENSE AND TO INCLUDE IN A RESOURCE SET

TECHNICAL FIELD

The examples and non-limiting example embodiments relate generally to communications and, more particularly, to resource allocation slot aggregation aspects.

BACKGROUND

It is known for two terminal devices to communicate using configured resources in a communication network.

SUMMARY

In accordance with an embodiment, an apparatus includes: at least one processor; and at least one memory storing instructions that, when executed by the at least one processor, cause the apparatus at least to: determine whether a resource pool of a group of time slots associated with a first carrier spacing overlaps with a resource pool of a frame associated with a second carrier spacing within a period of time; wherein the first carrier spacing has a higher frequency than the second carrier spacing, and the period of time comprises the group of time slots associated with the first carrier spacing and the frame associated with the second carrier spacing; and perform sensing of at least one time slot of the group of time slots, based on whether the resource pool of the group of time slots associated with the first carrier spacing overlaps with the resource pool of the frame associated with the second carrier spacing within the period of time.

In accordance with an aspect, an apparatus includes: at least one processor; and at least one memory storing instructions that, when executed by the at least one processor, cause the apparatus at least to: select, from a candidate resource set comprising a set of at least one group of time slots, a group of time slots of the candidate resource set; wherein time slots of the group are contiguous; wherein the group of time slots is associated with a first carrier spacing and overlaps a frame associated with a second carrier spacing; wherein the first carrier spacing has a higher frequency than the second carrier spacing; and determine whether to transmit in a first time slot of the group, or to transmit in the first time slot of the group and at least one other time slot of the group starting with the first time slot.

In accordance with an aspect, an apparatus includes: at least one processor; and at least one memory storing instructions that, when executed by the at least one processor, cause the apparatus at least to: determine whether a first time slot of a group of time slots is valid for use as a candidate resource; wherein the time slots of the group of time slots are contiguous, and the group of time slots is associated with a first carrier spacing and overlap a frame associated with second carrier spacing; include the first time slot and the other time slots of the group of time slots within a candidate resource set, when the first time slot is determined to be valid for use as a candidate resource; and exclude the first time slot and the other time slots of the group of time slots from the candidate resource set, when the first time slot is determined to not be valid for use as a candidate resource.

In accordance with an aspect, an apparatus includes at least one processor; and at least one memory storing instructions that, when executed by the at least one processor, cause the apparatus at least to: receive a transmission in a first time slot of a group of time slots associated with a first carrier spacing, or receive a transmission in the first time slot of the group and at least one other time slot of the group starting with the first time slot; wherein the first time slot and the at least one other time slot are contiguous; wherein the first time slot is aligned with a start of the frame associated with a second carrier spacing, and the group of time slots overlaps the frame associated with the second carrier spacing; wherein the first carrier spacing has a higher frequency than the second carrier spacing.

BRIEF DESCRIPTION OF THE DRAWINGS

The foregoing aspects and other features are explained in the following description, taken in connection with the accompanying drawings.

FIG. 12 is an example method to perform sensing, based on the examples described herein.

FIG. 13 is an example method to perform grouping or aggregation, based on the examples described herein.

FIG. 14 is an example method to generate a candidate resource set, based on the examples described herein.

FIG. 15 is an example method of a receiver, based on the examples described herein.

DETAILED DESCRIPTION OF EXAMPLE EMBODIMENTS

Figure 1:
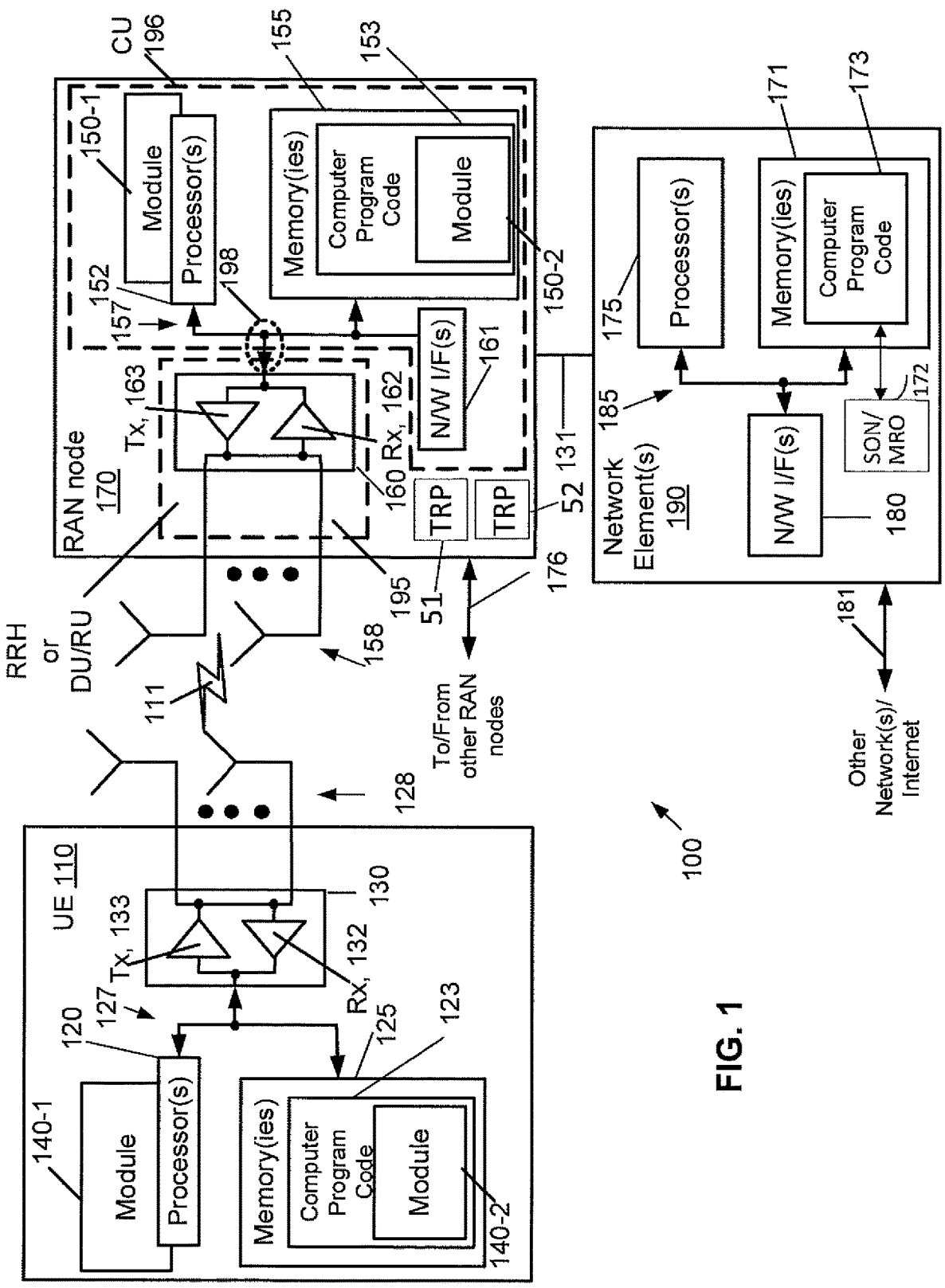
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including resource allocation slot aggregation. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

Introduction

3GPP has started the standardization effort for co-channel coexistence allowing NR SL and LTE SL to coexist on a shared frequency channel in the ITS spectrum. The WID [RP-220300] justification and objective for co-channel coexistence is as follows:

---

Another aspect to consider is the V2X deployment scenario where both LTE V2X and NR V2X devices are to coexist in the same frequency channel. For the two different types of devices to coexist while using a common carrier frequency, it is important that there is mechanism to efficiently utilize resource allocation by the two technologies without negatively impacting the operation of each technology. This requirement was also mentioned as part of the input from 5G Automotive Association to the Rel-18 RAN -continued Workshop.

. . .

4.   Study and specify, if necessary, mechanism(s) for co-channel coexistence for
        LTE sidelink and NR sidelink including performance, necessity, feasibility, and
        potential specification impact if any [RAN1, RAN2, RAN4]
        -   Reuse the in-device coexistence framework defined in Rel-16 as much as
           possible

NR-SL Overview

Figure 2A:
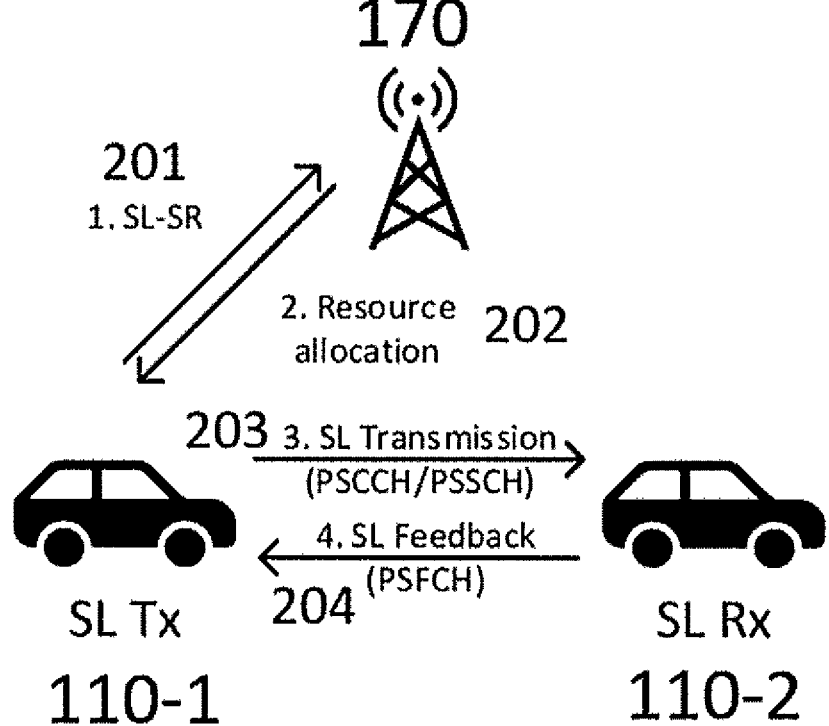
FIG. 2A depicts NR SL allocation mode 1.
Figure 2B:
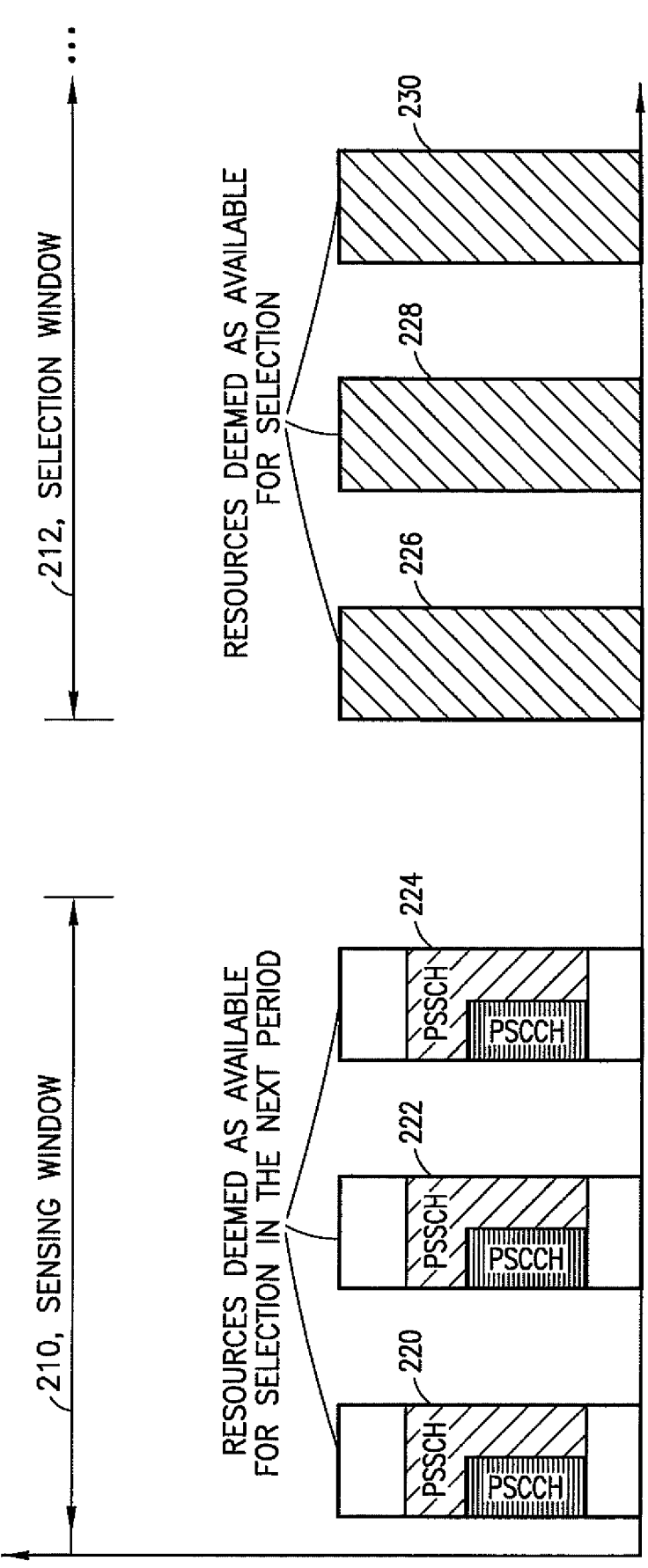
FIG. 2B depicts NR SL allocation mode 2.

During 3GPP Rel-16, NR sidelink (SL) has been designed to facilitate a user equipment (UE) to communicate with other nearby UE(s) via direct/SL communication. Two resource allocation modes have been specified, and a SL transmitter (TX) UE is configured with one of them to perform its NR SL transmissions. These modes are denoted as NR SL mode 1 and NR SL mode 2. Referring to FIG. 2A and FIG. 2B, in mode 1, a sidelink transmission resource is assigned (scheduled) by the network (NW) to the SL TX UE 110-1, while a SL TX UE in mode 2 autonomously selects its SL transmission resources during selection window 212.

Referring to FIG. 2A, in mode 1, where the gNB 170 is responsible for the SL resource allocation, the configuration and operation are similar to the one over the Uu interface. The MAC level details of this procedure are given in section 5.8.3 of 38.321. At 201, SL Tx 110-1 transmits a sidelink scheduling request (SL-SR) to the network node 170. At 202, the network node 170 allocates one or more resources to SL Tx 110-1. At 203, SL Tx 110-1 performs SL transmission to SL Rx 110-2 using the allocated one or more resources, such as PSCCH or PSSCH. At 204, SL Rx 110-2 transmits SL feedback over a PSFCH to SL Tx 110-2.

Referring to FIG. 2B, in mode 2, the SL UEs perform autonomously the resource selection with the aid of a sensing procedure during sensing window 210. More specifically, a SL TX UE (e.g. UE 110) in NR SL mode 2 first performs a sensing procedure over the configured SL transmission resource pool(s), including resource pool 220, resource pool 222, and resource pool 224, in order to obtain knowledge of the reserved resource(s) by other nearby SL TX UE(s). Based on the knowledge obtained from sensing, the SL TX UE (110, 110-1) may select resource(s) from the available SL resources, accordingly. Resources deemed as available for selection include resource pool 226, resource pool 228, and resource pool 230. In order for a SL UE to perform sensing and obtain the necessary information to receive a SL transmission, the SL UE needs to decode the sidelink control information (SCI). In release 16, the SCI associated with a data transmission includes a 1st-stage SCI and 2nd-stage SCI, and their contents are standardized in 3GPP TS 38.212.

NR SL Resource Allocation Mode 2

In mode 2 SL, each UE autonomously selects resources by decoding a physical sidelink control channel (PSCCH) (or sidelink control information (SCI)) and performing RSRP measurement of (pre-)configured resource pool(s) based on a procedure specified in [3GPP 38.214 Sec 8.1] on a candidate resource pool during a sensing window interval.

Figure 3:
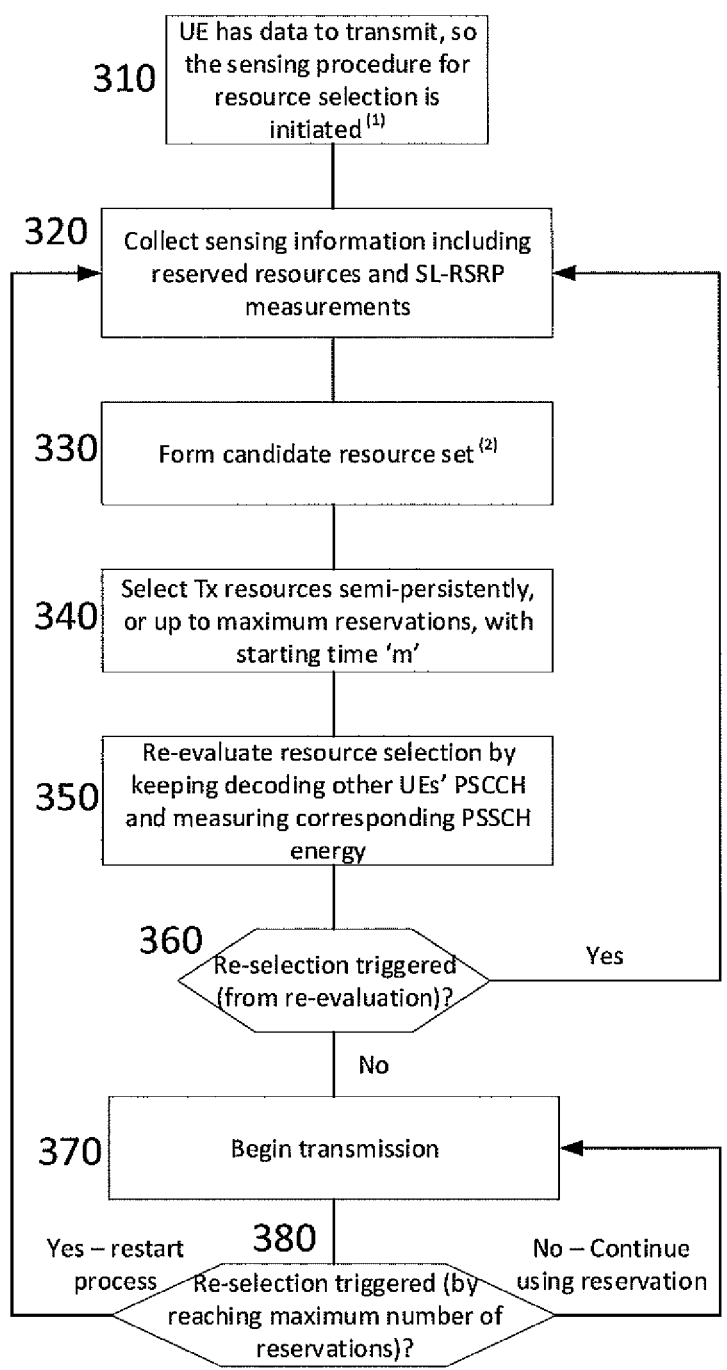
FIG. 3 is a flowchart depicting an SL mode 2 resource allocation scheme, including re-evaluation.

The procedure is depicted in FIG. 3, where the following elements are of note: (1) at 310, the monitoring of the resource pool and acquisition of information to be used during the resource selection procedure can be done prior to the Tx UE knowing that it has a transmission to perform; (2) at 330, after the Tx UE has acquired enough information from its monitoring of the resource pool it can form the candidate resource set.

At 310, the UE 110 has data to transmit, so the sensing procedure for resource selection is initiated. At 320, the UE 110 collects sensing information including reserved resources and SL-RSRP measurements. At 330, the UE 110 forms a candidate resource set. At 340, the UE 110 selects Tx resources semi-persistently, or up to maximum reservations, with starting time 'm'. At 350, the UE 110 re-evaluates resource selection by continuing to decode other UEs' PSCCH and measuring corresponding PSSCH energy. At 360, the UE 110 determines whether to trigger re-selection, based on the re-evaluation. If at 360 the UE 110 determines to trigger re-selection (e.g. "Yes"), the method transitions to 320. If at 360 the UE 1110 determines to not trigger re-selection (e.g. "No"), the method transitions to 370. At 370, the UE 110 begins transmission. At 380, it is determined e.g. by UE 110 whether to trigger re-selection, based on reaching a maximum number of reservations. If it is determined at 380 to not trigger re-selection (e.g. "No"), the UE continues to use the reservation and the method transitions to 370. If it is determined at 380 to trigger re-selection (e.g. "Yes") the UE restarts the process and the method transitions to 320.

Figure 4:
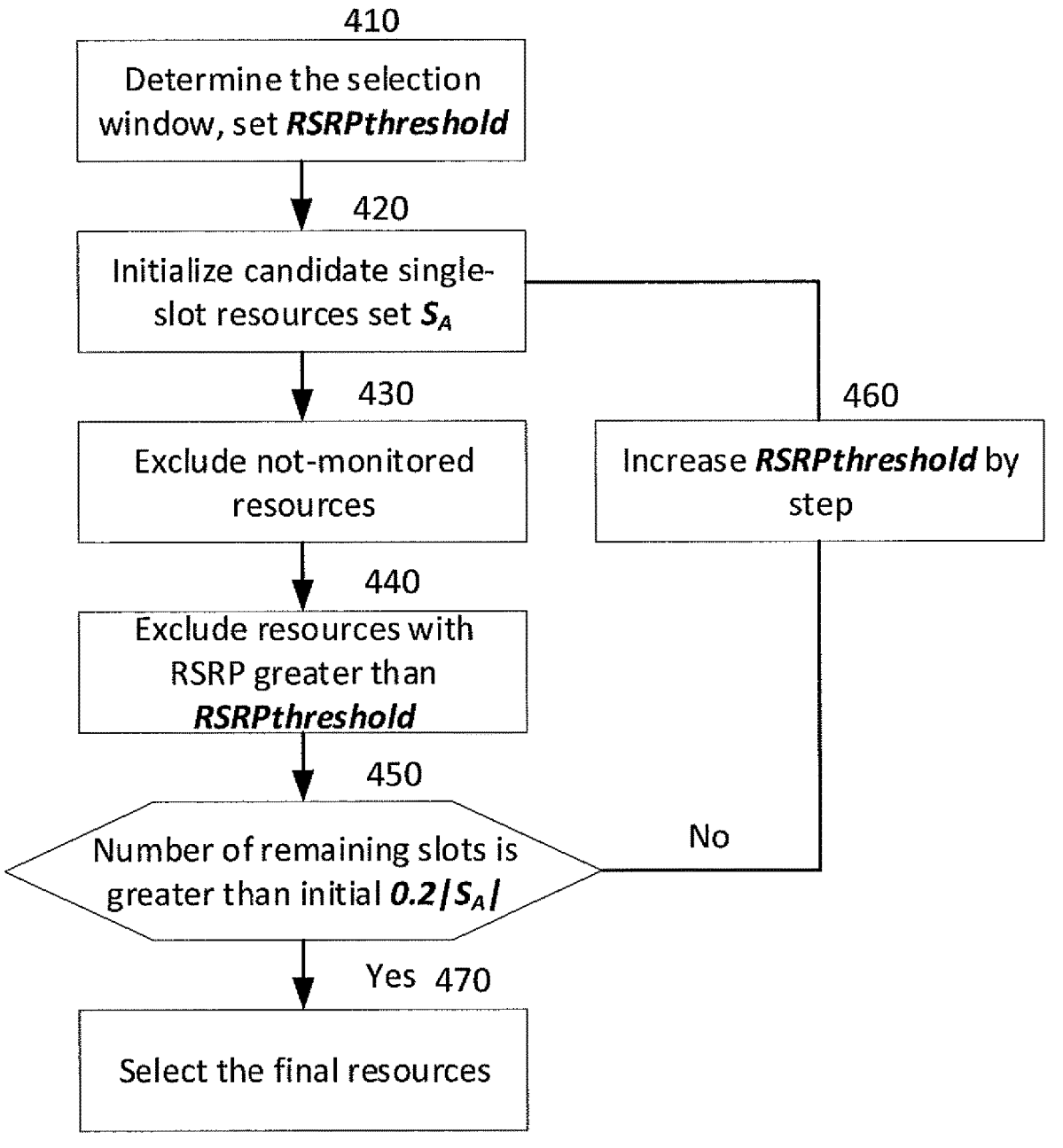
FIG. 4 shows a procedure to determine a resource candidate set.

The formation of the resource candidate set is depicted in FIG. 4, which occurs for resources within a candidate resource pool (220, 222, 224), which have been monitored during a sensing window interval 210. At 410, the UE 110 determines the selection window (212) and sets the RSRP threshold. During this sensing window interval 210, the UE 110 at 420 collects the set $S_A$ of potential candidate resource slots that are within a defined selection window period and at 430 and 440 excludes all resources/slots which i) the UE has not monitored (430) during the sensing period (e.g. due to own transmission or other activities including DRX), and ii) The decoded SCI format 1-A indicates that the candidate slot is reserved and the corresponding measured RSRP is above a pre-configured RSRPthreshold (440). If the candidate slot is not reserved, at 440 the UE 110 excludes resources with an RSRP greater than the RSRP threshold.

At 450, if the number of remaining single slot candidates is greater than $X|S_A|$ (where X=0.2, 0.35, 0.5), the UE 110 forwards the potential candidate slots to the higher layer (e.g. the MAC layer) for final resource selection (470). Otherwise at 460 the UE 110 increases the RSRPthreshold by a step (i.e. RSRPthreshold=RSRPthreshold+step, where the step per the TS 38.214 spec is currently defined to be 3 dB) and repeats the procedure which comprises transitioning to 420. Final candidate slots are then forwarded to higher layers for final resource selection.

LTE-V2x Overview

During 3GPP Rel-14 and Rel-15, LTE-V2X has been designed to facilitate vehicles to communicate with other nearby vehicles via direct/SL communication. Communications between these vehicles can take place in LTE-V2X using either mode 3 depicted in FIG. 5A or mode 4 depicted in FIG. 5B. SL Tx 110-1 is using NR in FIG. 2A and is acting as an NR UE, while SL Tx 110-1 is using LTE in FIG. 5A and is acting as an LTE UE.

Figure 5A:
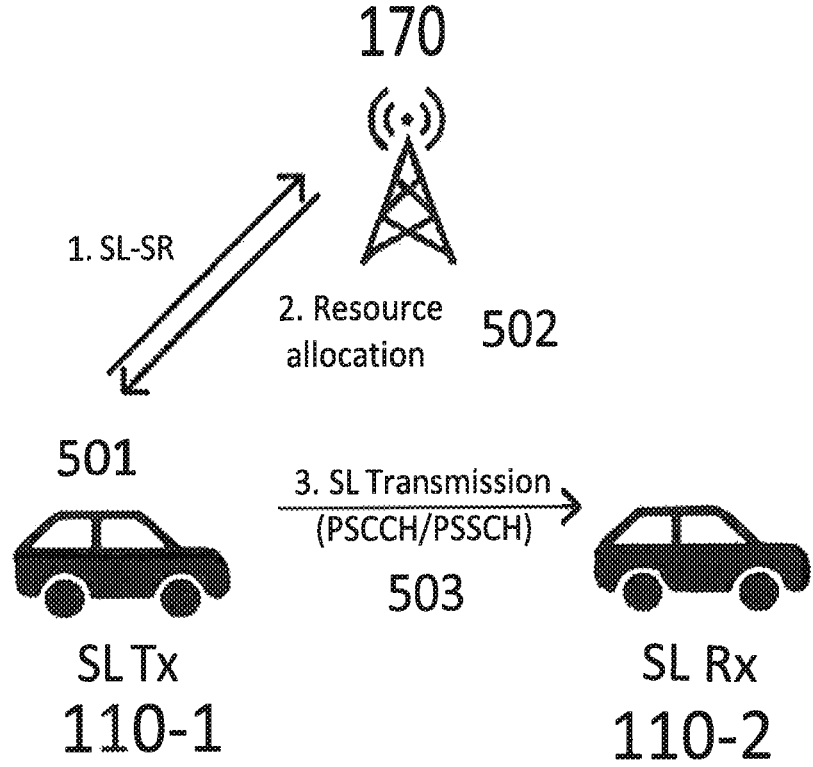
FIG. 5A depicts LTE SL resource allocation mode 3.

As shown in FIG. 5A (mode 3), at 501 the SL Tx 110-1 transmits a sidelink scheduling request (SL-SR) to the network node 170. At 502, the network node 170 allocates one or more resources to SL Tx 110-1. At 503, the SL Tx 110-1 performs an SL transmission to SL Rx 110-2, using the allocated one or more resources including PSCCH or PSSCH.

When in mode 3, the sidelink radio resources are scheduled by the base station or evolved NodeB (eNB) (170), hence, mode 3 is only available when vehicles are under cellular coverage.

When in mode 4, the vehicles autonomously select their sidelink radio resources regardless of whether they are under cellular coverage or not. When the vehicles are under cellular coverage, the network decides how to configure the LTE-V2X channel and informs the vehicles through the LTE-V2X configurable parameters. The message includes the carrier frequency of the LTE-V2X channel, the LTE-V2X resource pool, synchronization references, the channelization scheme, the number of subchannels per subframe, and the number of RBs per subchannel, among other things. When the vehicles are not under cellular coverage, they utilize a preconfigured set of parameters to replace the LTE-V2X configurable parameters. However, the standard does not specify a concrete value for each parameter. The LTE-V2X resource pool indicates which subframes of a channel are utilized for LTE-V2X. The rest of the subframes can be utilized by other services, including cellular communications.

The autonomous resource selection in mode 4 is performed using the sensing and resource exclusion procedure specified in Release 14, where a vehicle reserves the selected subchannel(s) for a number of periodically recurring packet transmissions. This in turn can be sensed by other vehicles, affecting their own resource selection/exclusion decisions.

Figure 5B:
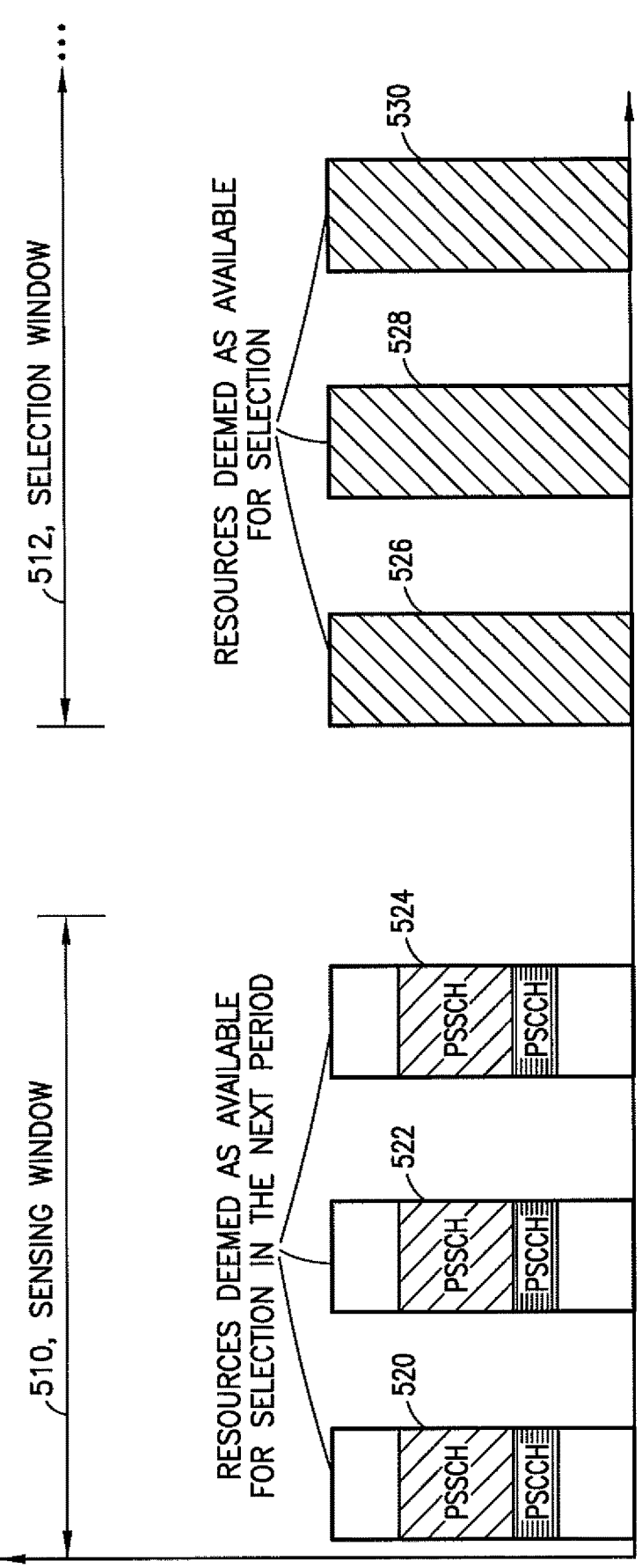
FIG. 5B depicts LTE SL resource allocation mode 4.

As shown in FIG. 5B (mode 4), during the sensing window 510 the UE senses the resources deemed as available for selection in the next period, including resources in resource pool 520, resource pool 522, and resource pool 524. During the selection window 512 the UE 110 determines the resources deemed as available for selection, including resources in resource pool 526, resource pool 528, and resource pool 530.

Physical Layer

LTE-V2X uses SC-FDMA (Single-Carrier Frequency-Division Multiple Access) and supports 10 MHz and 20 MHz channels. The channel is divided into 180 kHz Resource Blocks (RBs) that correspond to 12 subcarriers of 15 kHz each. In the time domain, the channel is organized into 1 ms subframes.

Figure 6:
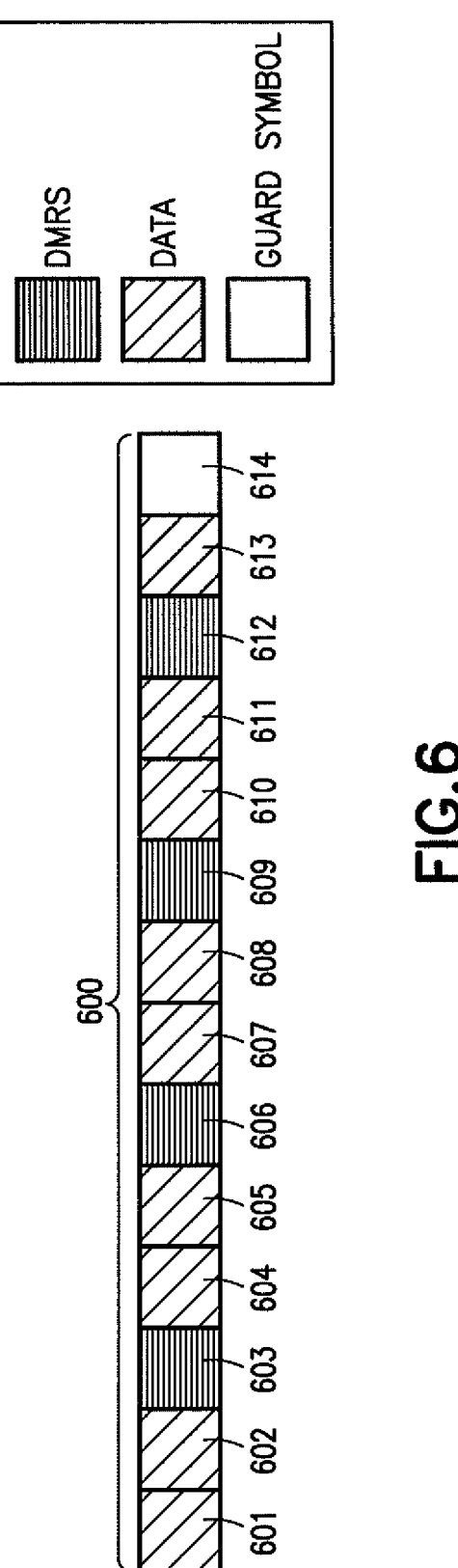
FIG. 6 shows an LTE-V2X (subframe) slot format for PSSCH and PSCCH.

FIG. 6 shows an example subframe 600. Each subframe has 14 OFDM symbols with normal cyclic prefix. Nine of these symbols are used to transmit data (symbols 601, 602, 604, 605, 607, 608, 610, 611, 613) and four of them (3rd, 6th, 9th, and 12th, or respectively symbols 603, 606, 609, 612) are used to transmit demodulation reference signals (DMRSs) for channel estimation and combating the Doppler effect at high speeds. The last symbol 614 is used as a guard symbol for timing adjustments and for allowing vehicles to switch between transmission and reception across subframes. Thus, the format of the subframe 600 is depicted in FIG. 6.

The RBs are grouped into sub-channels. A sub-channel can include RBs only within the same subframe. The number of RBs per sub-channel can vary and is (pre-)configured. Sub-channels are used to transmit data and control information. The data is organized in transport blocks (TBs) that are carried in the physical sidelink shared channel (PSSCH). A TB contains a full packet (e.g., a CAM or a BSM). A TB can occupy one or several subchannels depending on the size of the packet, the number of RBs per sub-channel, and the utilized modulation and coding scheme (MCS). TBs can be transmitted using QPSK, 16-QAM or 64-QAM modulations and turbo coding.

Each TB has an associated sidelink control information (SCI) message that is carried in the physical sidelink control channel (PSCCH). It is also referred to as a scheduling assignment (SA). An SCI occupies 2 RBs and includes information such as: an indication of the RBs occupied by the associated TB; the MCS used for the TB; the priority of the message that is being transmitted; an indication of whether it is a first transmission or a blind retransmission of the TB; and the resource reservation interval. A blind retransmission refers to a scheduled retransmission or repetition of the TB (i.e., not based on feedback from the receiver). The resource reservation interval specifies when the vehicle may utilize the reserved sub-channel(s) to transmit its next TB. The SCI includes critical information for the correct reception of the TB. A TB cannot be decoded properly if the associated SCI is not received correctly. A TB and its associated SCI must be transmitted always in the same subframe.

Figure 7:
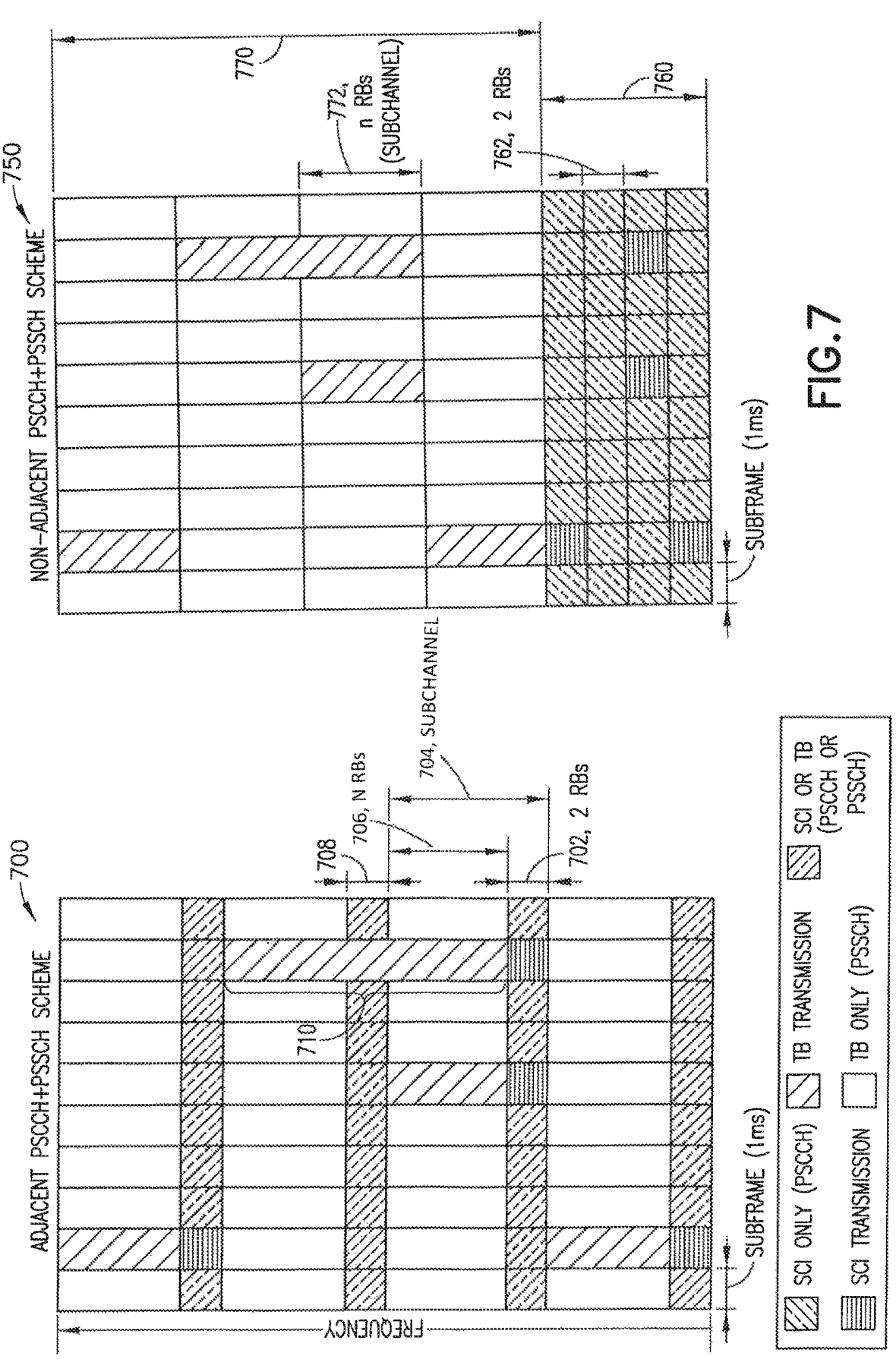
FIG. 7 illustrates LTE-V2X channelization, with adjacent PSCCH and PSSCH and non-adjacent PSCCH and PSSCH.

FIG. 7 shows an adjacent PSCCH and PSSCH scheme (700) and a non-adjacent PSCCH and PSSCH scheme (750). As depicted in FIG. 7, the TB (PSSCH) and its associated SCI (PSCCH) can be transmitted in adjacent or non-adjacent sub-channels, where (A-B immediately following):

A. Adjacent PSCCH and PSSCH (700): The SCI and TB are transmitted in adjacent RBs. For each SCI and TB (e.g. SCI+TB) transmission, the SCI occupies the first two RBs (e.g. 702) of the first subchannel (e.g. subchannel 704) utilized for the transmission. The TB is transmitted in the RBs following the SCI (e.g. RBs 706), and can occupy several subchannels (depending on its size) including for example subchannel 704. If the TB transmission does so, the TB transmission also occupies the first two RBs of the following subchannels, such as the two RBs 708 occupied by TB transmission 710.

B. Nonadjacent PSCCH and PSSCH (750): The RBs are divided into pools. One pool 760 is dedicated to transmit only SCIs, and the SCIs occupy two RBs such as two RBs 762. The second pool 770 is reserved to transmit only TBs and is divided into subchannels such as subchannel 772.

Relevant 3GPP Discussions

During the RAN1 #110e discussions, the following FFS was made regarding the support of higher SCS for NR transmissions:

---

Agreement

For co-channel coexistence in Rel-18, dynamic resource pool sharing is studied, with the following constraints:

○  NR SL resource pool is configured with 15 KHz SCS.

■  FFS support of NR SL resource pool configured with higher SCS, including other solutions to overcome the AGC issue caused by the differing SCSs between the NR SL and LTE SL resource pools -continued ○ For NR PSFCH (if configured), at least the following alternatives are studied:
　　■ Alt 1: Avoid PSFCH transmission in time slots that overlap with subframes used for LTE SL transmissions.
　　　　● FFS: Avoiding PSFCH transmission can be performed by the UE transmitting PSFCH and/or the UE transmitting PSSCH.
　　■ Alt 2: NR SL UEs use a periodically repeating set of PSFCH slots.
　　　　● FFS: periodicities of the set.

Then in RAN1 #111e there was this proposal, which since then has not yet been agreed to become an agreement.

Proposal 1-5 (II):
　•For dynamic resource pool sharing, the following options are studied to resolve the AGC issue in LTE SL UEs which is caused by NR SL PSCCH/PSSCH transmissions if higher SCSs are supported:
　　● Option 1: The NR SL transmissions of higher SCSs are transmitted on all slots within a LTE SL subframe of 15 kHz
　　　§FFS: Whether this takes place in all slots configured within the LTE SL resource pool or only when the NR SL transmission overlaps an LTE SL transmission based on information shared by the LTE SL module.
　　● Option 3: NR SL UE uses the information shared by the LTE SL module in its own resource selection procedure to exclude slots overlapping with LTE SL transmissions.
　　　§FFS: Exclude only those slots where the first symbol of the NR SL transmission is not overlapping in time with the first symbol of the LTE subframe.

•Note:
This study does not imply RAN1 supporting higher SCS

Figure 8A:
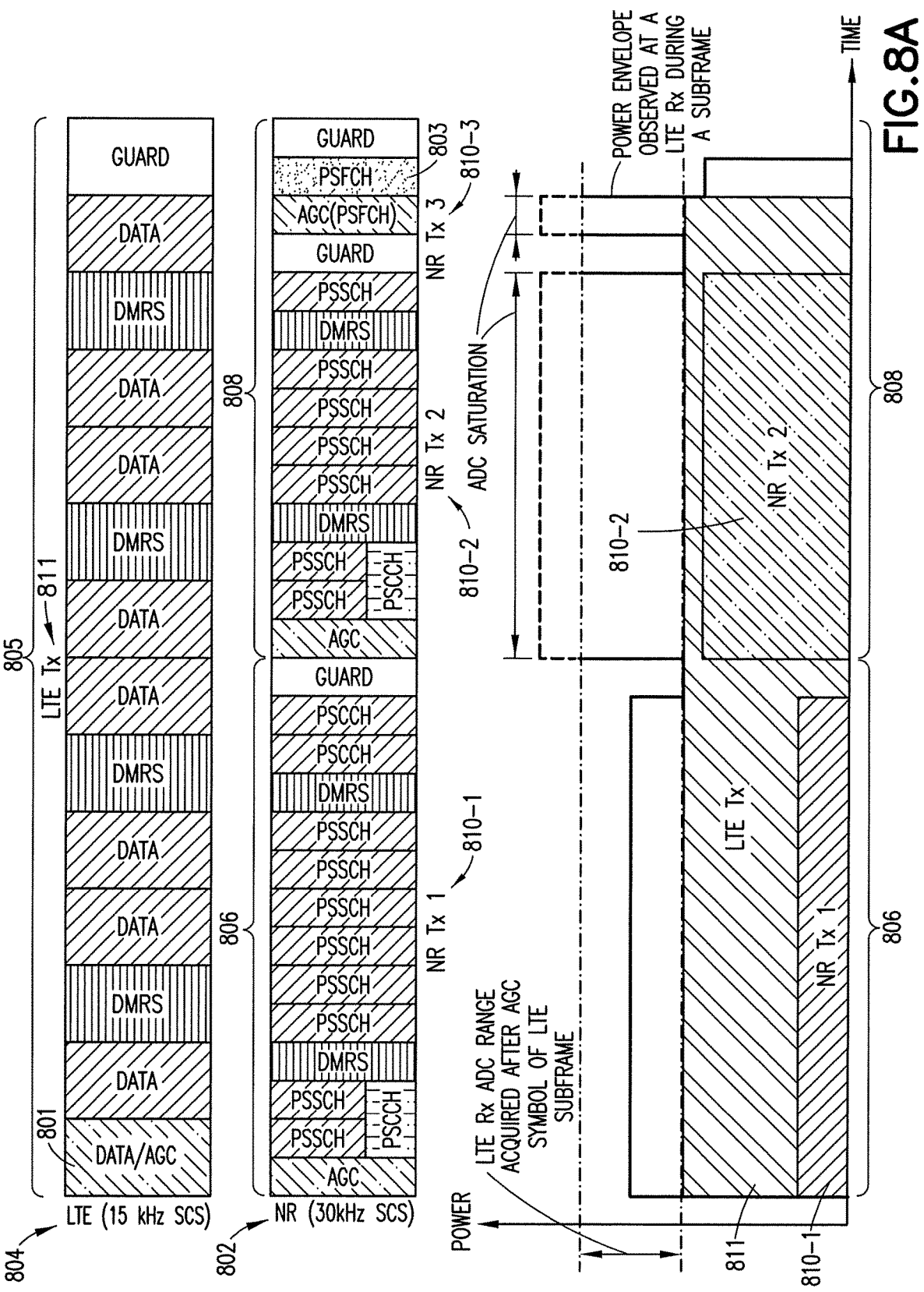
FIG. 8A depicts NR transmissions from different NR Tx in both NR slots overlapping with the LTE sub-frame.
Figure 8B:
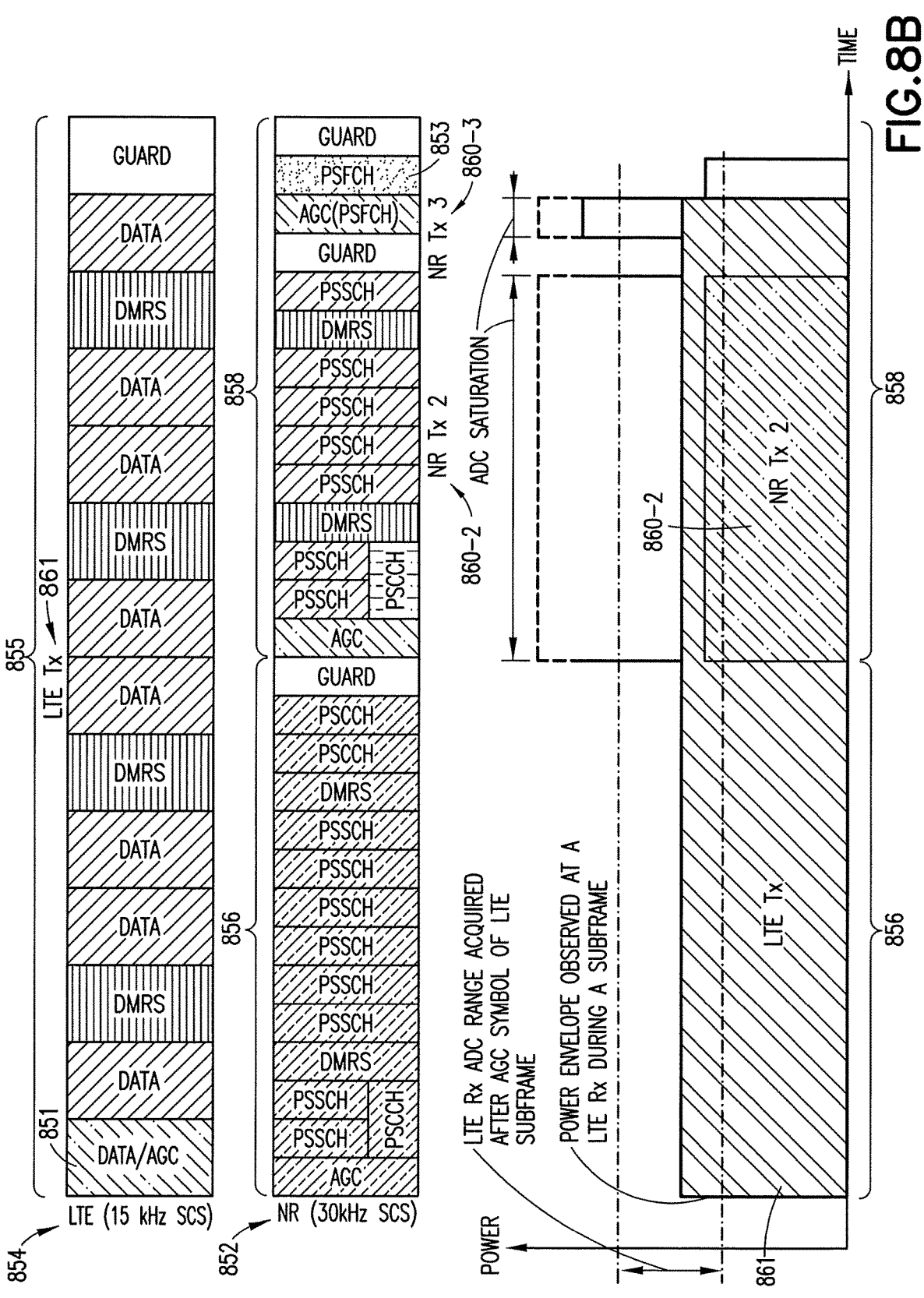
FIG. 8B depicts NR transmission from a NR Tx in the second slot overlapping with the LTE sub-frame.

Referring to FIG. 8A and FIG. 8B, in the LTE SL subframe structure design, the first symbol of each LTE SL subframe is an AGC symbol (801, 851), used by an LTE SL Rx UE to adjust the AGC gain of the incoming signal to minimize the quantization noise and prevent saturation at the transceiver ADC (analog-to-digital converter). The LTE SL Rx UE (e.g. UE 110) is assumed to set the AGC gain based on a carrier wide measurement, as it is assumed that analog filtering prior to ADC is used to filter out-of-band signals while signals within the carrier frequency band are not filtered. Further, it is assumed that the LTE SL Rx UE applies this AGC gain for the entire duration of the subframe considering the power is expected to remain constant within the subframe (similar assumption made by an NR SL Rx UE e.g. UE 110).

The AGC issue to the LTE SL Rx may occur in the depicted examples in FIG. 8A and FIG. 8B, where NR SL (802, 852) operates with 30 kHz SCS while LTE SL (804, 854) only supports 15 kHz SCS. In this case, there are 2 NR SL slots that overlap (in time) a single LTE SL subframe and the AGC issue occurs when: i) the NR SL transmissions in the first and second slots are from different NR UEs (as depicted in FIG. 8A), or ii) the NR transmission occurs only in the second slot (as depicted in FIG. 8B).

FIG. 8A shows two NR slots (806, 808) that overlap in time with LTE subframe 805, and FIG. 8B shows two NR slots (856, 858) that overlap in time with LTE subframe 855. In FIG. 8A, NR Tx 1 810-1 transmits in slot 806 and NR Tx 2 810-2 transmits in slot 808. Also shown is NR Tx 3 810-3 and LTE Tx 811. In FIG. 8B, NR Tx 2 860-2 transmits in the second slot 858. Also shown is NR Tx 3 860-3. NR Tx 1 810-1, NR Tx 2 810-2, NR Tx 3 810-3, LTE Tx 811, NR Tx 2 860-2, NR Tx 3 860-3, and LTE Tx 861 correspond to transmitting devices.

FIG. 8A and FIG. 8B show the impact of NR transmissions inducing on the setting of the LTE Rx's AGC. FIG. 8A shows NR transmissions from different NR Tx (810-1 and 810-2) in both NR slots (806, 808) overlapping with the LTE sub-frame 805. FIG. 8B shows an NR transmission from a NR Tx 860-2 in the second slot 858 overlapping with the LTE sub-frame 855. In both cases there is a PSFCH transmission (803, 853) taking place in the second slot (808, 858). The NR subchannel is not necessarily overlapped in frequency with the LTE subchannels, but the NR subchannel is overlapped in time with the LTE subchannels.

The second slot (808, 858) comprises both the PSCCH/PSSCH and PSFCH symbols. In the second slot (808, 858) there can be two transmissions. One in the slot 858 from one UE (e.g. associated with NR Tx 2 810-2), and the other in slot 853 from the same UE (e.g. associated with NR Tx 2 810-2) or even a third UE (e.g. associated with NR Tx 3 810-3).

In the case depicted in FIG. 8B, an NR SL transmission happens in the second slot 858. In this case, the LTE Rx performs the AGC adjustment in the first symbol of a LTE SL subframe where a NR SL transmission is absent and the AGC's gain is adjusted to a lower received signal power (LTE only). When the NR (860-2) performs its transmission in the second slot 858 then its signal is added to the ongoing LTE SL transmission—which increases the total received power at the LTE Rx—while the AGC's gain determined in the first slot is still the one being applied.

To tackle this, in the 3GPP discussions the following two options were considered, option 1 and option 3 (see Proposal 1-5 (II) in section 2.4). In option 1, the NR SL transmissions of higher SCSs are transmitted on all slots within a LTE SL subframe of 15 kHz. In option 3, the NR SL UE uses the information shared by the LTE SL module in its own resource selection procedure to exclude slots overlapping with LTE SL transmissions.

Option 1 proposes the introduction of slot aggregation, where a NR UE when performing its transmission combines multiple NR slots that overlap with a LTE subframe. However, the details on how the sensing and resource selection procedure should take place have not been discussed.

Accordingly, described herein is a sensing procedure when operating with slot aggregation, related to how to perform the slot aggregation as described in Option 1 and in which conditions the NR UE should perform a single slot transmission or aggregated slot transmission. In the examples described herein, the PHY layer conducts resource (re-)selection as normal, but the MAC layer is then responsible for extending the candidate resources to the (predetermined) group of slots.

Described herein are (1) changes to the NR sensing procedure to cope with NR slot grouping/aggregation and (2) changes to the use of NR slot grouping/aggregation to minimize the occurrence of persistent collisions and to avoid resource exclusion due to un-monitored slots.

Regarding the changes in the NR sensing procedure, described herein are items 1-3 as follows.

Figure 9:
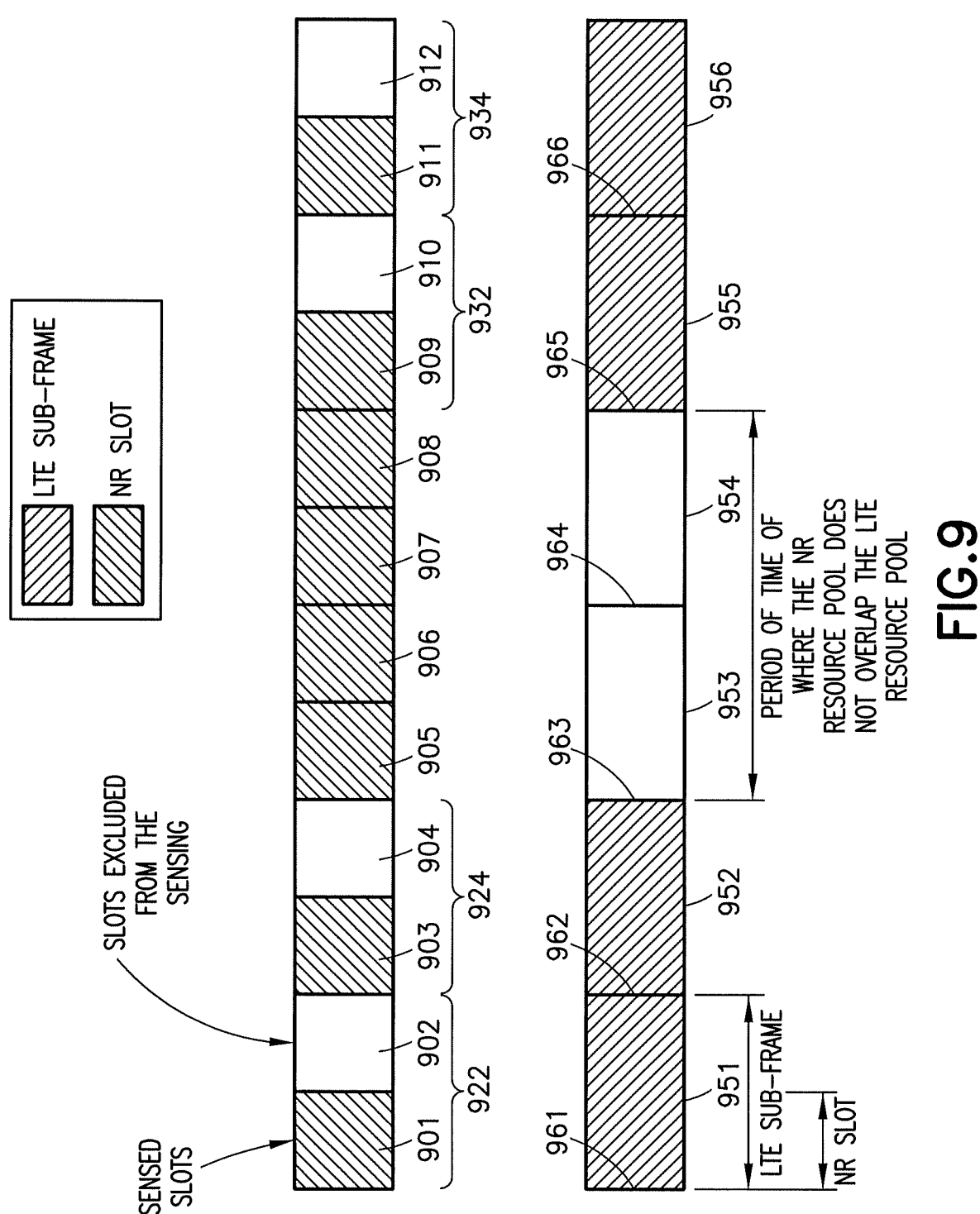
FIG. 9 shows an example of NR sensing in the first slot when the NR slots overlap in time with the LTE sub-frames, for the case where NR has 30 kHz SCS and LTE has 15 kHz SCS.

1. For all the slots where the NR resource pool overlaps in time with a LTE resource pool, the NR UE 110 performs sensing only in the first slot of the group of slots that overlaps an LTE sub-frame as depicted in FIG. 9. In contrast, when there is no overlap in time between the NR and LTE resource pool, then the NR UE performs sensing in all the NR slots during that period. The assumption here is that no NR UE is allowed to start its transmission in a later slot not aligned with the start of the LTE subframe. The slot that is not aligned with the start of the LTE subframe may be referred to as the second slot or other slot. Thus, FIG. 9 shows an example of NR sensing in the first slot when the NR slots overlap in time with the LTE sub-frames, for the case where NR has 30 kHz SCS and LTE has 15 kHz SCS. Squares 902, 904, 910, and 912 are still NR slots, but these are not sensed.

In the example shown in FIG. 9, NR slots 901 and 902 form a group of slots 922 of a period of time shared with LTE sub-frame 951, NR slots 903 and 904 form a group of slots 924 of a period of time shared with LTE sub-frame 952, NR slots 909 and 910 form a group of slots 932 of a period of time shared with LTE sub-frame 955, and NR slots 911 and 912 form a group of slots 934 of a period of time shared with LTE sub-frame 956. NR slots 905 and 906 share a period of time with LTE sub-frame 953, and NR slots 907 and 908 share a period of time with LTE sub-frame 954.

In the period of time given with NR slots 901 and 902 and LTE sub-frame 951, the NR resource pool overlaps with the LTE resource pool, and as a result the NR UE 110 performs sensing in the first slot 901 of the group of slots 922 that overlaps LTE sub-frame 951. In the period of time given with NR slots 903 and 904 and LTE sub-frame 952, the NR resource pool overlaps with the LTE resource pool, and as a result the NR UE 110 performs sensing in the first slot 903 of the group of slots 924 that overlaps LTE sub-frame 952. In the period of time given with NR slots 909 and 910 and LTE sub-frame 955, the NR resource pool overlaps with the LTE resource pool, and as a result the NR UE 110 performs sensing in the first slot 909 of the group of slots 932 that overlaps LTE sub-frame 955. In the period of time given with NR slots 911 and 912 and LTE sub-frame 956, the NR resource pool overlaps with the LTE resource pool, and as a result the NR UE 110 performs sensing in the first slot 911 of the group of slots 934 that overlaps LTE sub-frame 956. Slots 902, 904, 910, and 912 are excluded from sensing.

Since there is no overlap in time between the NR and LTE resource pool during the time period given with NR slots 905 and 906 which period of time overlaps with LTE sub-frame 953, the NR UE 110 performs sensing in both NR slots 905 and 906 during that period. Since there is no overlap in time between the NR and LTE resource pool during the time period given with NR slots 907 and 908 which period of time overlaps with LTE sub-frame 954, the NR UE 110 performs sensing in both NR slots 907 and 908 during that period.

As mentioned, the assumption is that no NR UE is allowed to start its transmission in a later slot not aligned with the start of the LTE subframe. Thus the UE 110 (when acting as an NR UE, not necessarily as an LTE UE) and SL Tx 110-1 (when acting as an NR UE, not necessarily as an LTE UE) are not allowed to start transmission in slot 902 that is not aligned with the start 961 of LTE subframe 951, the NR UE 110 and SL Tx 110-1, when acting as an NR UE, not necessarily as an LTE UE, are not allowed to start transmission in slot 904 that is not aligned with the start 962 of LTE subframe 952, NR UE 110 and SL Tx 110-1, when acting as an NR UE, not necessarily as an LTE UE, are not allowed to start transmission in slot 906 that is not aligned with the start 963 of LTE subframe 953, the NR UE 110 and SL Tx 110-1, when acting as an NR UE, not necessarily as an LTE UE, are not allowed to start transmission in slot 908 that is not aligned with the start 964 of LTE subframe 954, the NR UE 110 and SL Tx 110-1, when acting as an NR UE, not necessarily as an LTE UE, are not allowed to start transmission in slot 910 that is not aligned with the start 965 of LTE subframe 955, and the NR UE 110 and SL Tx 110-1, when acting as an NR UE, not necessarily as an LTE UE, are not allowed to start transmission in slot 912 that is not aligned with the start 966 of LTE subframe 956. The slot (902, 904, 906, 908, 910, 912) that is not aligned with the start (961, 962, 963, 964, 965, 966) of the LTE subframe (respectively 951, 952, 953, 954, 955, 956) may be referred to as the second slot or other slot.

2. During the creation of the candidate resource set, that whenever the NR UE determines that the first sensing slot (of a group of slots that overlaps an LTE sub-frame) is valid for use as candidate resource, then all the remaining slots in the group are also included into the candidate resource set. This means that at the conclusion of the resource selection procedure occurring at the physical layer, which concludes with the creation of the candidate resource set, the MAC layer is provided with a candidate resource set that contains not only the valid sensed slots but also the remaining slots in the respective slot group. Additionally, if a first slot in a group is deemed to not be valid then all remaining slots in the group are also excluded. Note that this implies that the group of contiguous slots overlapping a LTE sub-frame is interpreted as a single member of this set by the MAC layer, while in the prior-art the single member of the set is a single NR slot. This ensures that a transmission can only start in the first slot.

3. In the case a NR UE is unable to sense the first slot of the group of slots (e.g. due to being transmitting or due to in-device coexistence issues such as operation over the Uu interface), that it also senses at least one of the remaining slots in group in order to be able to acquire information to later determine if a group of slots is valid or not. There can be several reasons that an NR UE is unable to sense the first slot. One reason is that the UE is transmitting in the first slot, another that it has been interrupted by an internal prioritization e.g. via IDC. If an NR UE is allowed to transmit in a subset of the slots in the group of slots, then the NR UE sensing not the first slot, still has to consider the first slot as non-monitored. However, if an NR UE is not allowed to transmit only in the first slot, the NR UE which does not sense the first slot, may consider the first slot as "monitored".

Regarding the changes to the use of NR slot grouping/aggregation, described herein are items A-C immediately following.

A. The MAC selects from the candidate resource set a single set member in a random uniform way and that this member is a group of contiguous slots that overlap an LTE sub-frame in time.

B. The MAC can decide, if the specifications allow (as mentioned in 3)), if the UE transmits just in the first NR slot of the group or also in the remaining slots of the group (as long as this transmission occurs over contiguous slots and starts with the first slot in the group); a. The transmission across multiple slots in the group can be repetitions of the same TB or can correspond to multiple TBs. Furthermore, it is assumed that each slot transmission includes the relevant NR sidelink channels, i.e. at least the PSCCH (1 st stage SCI) and PSSCH (2nd stage SCI and data); b. The content of the 1st stage SCI included in each of the multiple slots, should be such that it allows a device when sensing any of these slots to determine the status of the other aggregated slots in order to allow the inclusion or exclusion of these during the resource selection procedure.

C. The decision to transmit in single or multiple slots from the selected group of slots (always starting with the first slot in the group) can be based on items a-c as follows.

a. Select a single slot (or only a few of the slots in the group) for transmission, to allow the NR device to still perform sensing in at least one of the remaining slots in the group and therefore avoid resource exclusion due to un-monitored NR slots.

b. Select a single slot, to allow the NR device to sense if other periodic NR transmissions are taking place in the same resources, i.e. avoid persistent collisions; this can be triggered based on the observation of lack of PSFCH feedback or on the detection that PSFCH resources mapped to the selected resources are being used and the NR device has not requested for PSFCH feedback.

c. Selecting multiple slots and then decreasing the transmission power per slot to optimize power amplifier operation or to avoid the triggering of an in-device coexistence mechanism due to lack of power budget to support multiple transmissions at the same time (in the same RAT or across RATs). The reduced transmission power can then be recovered based on the soft combining of the multiple transmissions. This can also be triggered on the observation of the lack of PSFCH feedback or on the detection that PSFCH resources mapped to the selected resources are being used and the NR device has not requested for PSFCH feedback. The NR UE may apply the same transmission energy density in all grouped slots.

FIG. 7 is an example apparatus 1000, which may be implemented in hardware, configured to implement the examples described herein. The apparatus 1000 comprises at least one processor 1002 (e.g. an FPGA and/or CPU), one or more memories 1004 including computer program code 1005, the computer program code 1005 having instructions to carry out the methods described herein, wherein the at least one memory 1004 and the computer program code 1005 are configured to, with the at least one processor 1002, cause the apparatus 1000 to implement circuitry, a process, component, module, or function (implemented with control module 1006) to implement the examples described herein, including resource allocation slot aggregation aspects. The memory 1004 may be a non-transitory memory, a transitory memory, a volatile memory (e.g. RAM), or a non-volatile memory (e.g. ROM).

The apparatus 1000 includes a display and/or I/O interface 1008, which includes user interface (UI) circuitry and elements, that may be used to display aspects or a status of the methods described herein (e.g., as one of the methods is being performed or at a subsequent time), or to receive input from a user such as with using a keypad, camera, touch-screen, touch area, microphone, biometric recognition, eye tracking, one or more sensors, etc. The apparatus 1000 includes one or more communication e.g. network (N/W) interfaces (I/F(s)) 1010. The communication I/F(s) 1010 may be wired and/or wireless and communicate over the Internet/other network(s) via any communication technique including via one or more links 1024. The link(s) 1024 may be the link(s) 131 and/or 176 from FIG. 1. The link(s) 131 and/or 176 from FIG. 1 may also be implemented using transceiver(s) 1016 and corresponding wireless link(s) 1026. The communication I/F(s) 1010 may comprise one or more transmitters or one or more receivers.

The transceiver 1016 comprises one or more transmitters 1018 and one or more receivers 1020. The transceiver 1016 and/or communication I/F(s) 1010 may comprise standard well-known components such as an amplifier, filter, frequency-converter, (de)modulator, and encoder/decoder circuitries and one or more antennas, such as antennas 1014 used for communication over wireless link 1026.

The control module 1006 of the apparatus 1000 comprises one of or both parts 1006-1 and/or 1006-2, which may be implemented in a number of ways. The control module 1006 may be implemented in hardware as control module 1006-1, such as being implemented as part of the one or more processors 1002. The control module 1006-1 may be implemented also as an integrated circuit or through other hardware such as a programmable gate array. In another example, the control module 1006 may be implemented as control module 1006-2, which is implemented as computer program code (having corresponding instructions) 1005 and is executed by the one or more processors 1002. For instance, the one or more memories 1004 store instructions that, when executed by the one or more processors 1002, cause the apparatus 1000 to perform one or more of the operations as described herein. Furthermore, the one or more processors 1002, one or more memories 1004, and example algorithms (e.g., as flowcharts and/or signaling diagrams), encoded as instructions, programs, or code, are means for causing performance of the operations described herein.

The apparatus 1000 to implement the functionality of control 1006 may be UE 110, RAN node 170 (e.g. gNB), or network element(s) 190. Thus, processor 1002 may correspond to processor(s) 120, processor(s) 152 and/or processor(s) 175, memory 1004 may correspond to one or more memories 125, one or more memories 155 and/or one or more memories 171, computer program code 1005 may correspond to computer program code 123, computer program code 153, and/or computer program code 173, control module 1006 may correspond to module 140-1, module 140-2, module 150-1, and/or module 150-2, and communication I/F(s) 1010 and/or transceiver 1016 may correspond to transceiver 130, antenna(s) 128, transceiver 160, antenna(s) 158, N/W I/F(s) 161, and/or N/W I/F(s) 180. Alternatively, apparatus 1000 and its elements may not correspond to either of UE 110, RAN node 170, or network element(s) 190 and their respective elements, as apparatus 1000 may be part of a self-organizing/optimizing network (SON) node or other node, such as a node in a cloud, or correspond to apparatus SL Tx 110-1.

The apparatus 1000 may also be distributed throughout the network (e.g. 100) including within and between apparatus 1000 and any network element (such as a network control element (NCE) 190 and/or the RAN node 170 and/or the UE 110).

Figure 10:
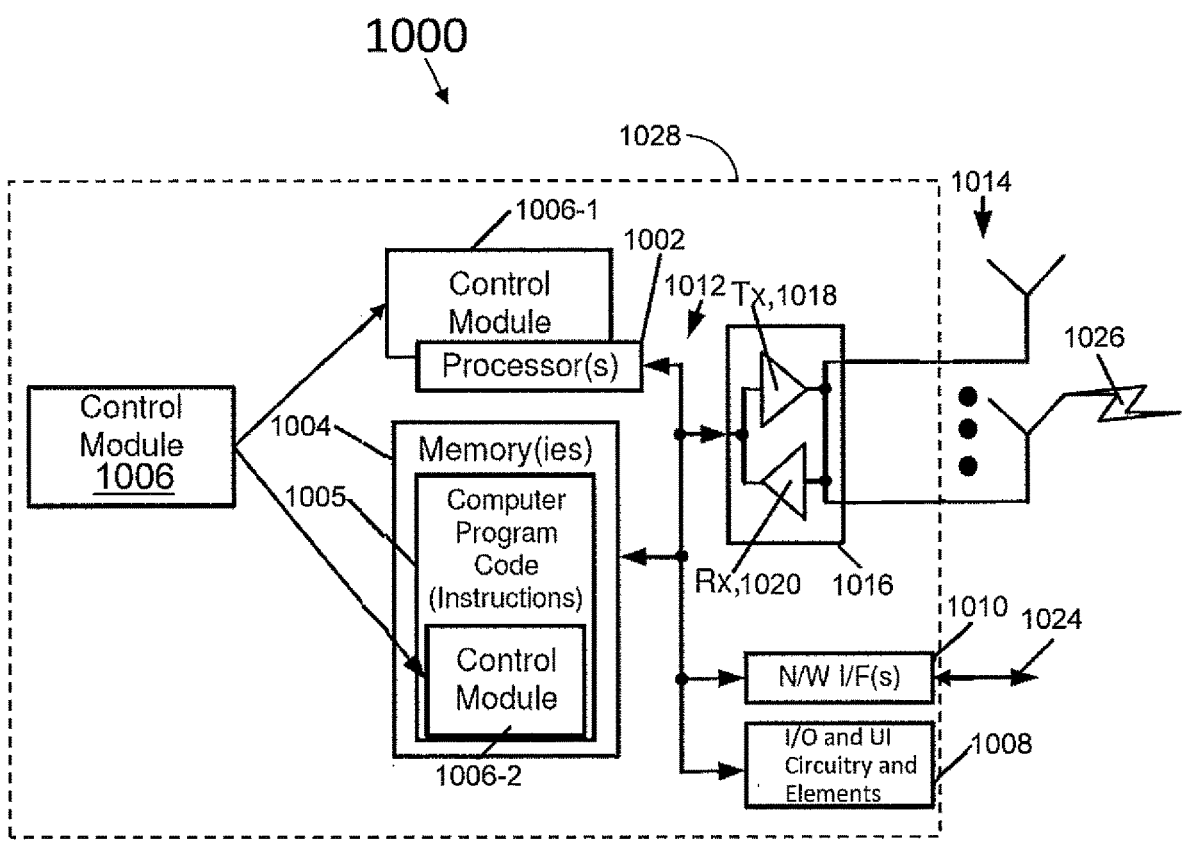
FIG. 10 is an example apparatus configured to implement the examples described herein.

Interface 1012 enables data communication between the various items of apparatus 1000, as shown in FIG. 10. For example, the interface 1012 may be one or more buses such as address, data, or control buses, and may include any interconnection mechanism, such as a series of lines on a motherboard or integrated circuit, fiber optics or other optical communication equipment, and the like. Computer program code (e.g. instructions) 1005, including control 1006 may comprise object-oriented software configured to pass data or messages between objects within computer program code 1005. The apparatus 1000 need not comprise each of the features mentioned, or may comprise other features as well. The various components of apparatus 1000 may at least partially reside in a common housing 1028, or a subset of the various components of apparatus 1000 may at least partially be located in different housings, which different housings may include housing 1028.

Figure 11:
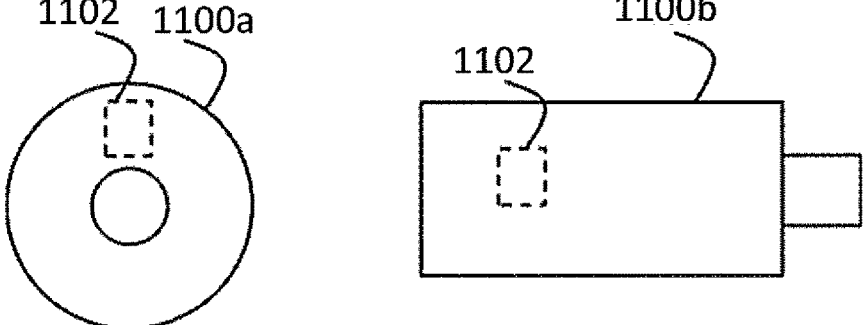
FIG. 11 shows a representation of an example of non-volatile memory media.

FIG. 11 shows a schematic representation of non-volatile memory media 1100a (e.g. computer/compact disc (CD) or digital versatile disc (DVD)) and 1100b (e.g. universal serial bus (USB) memory stick) storing instructions and/or parameters 1102 which when executed by a processor allows the processor to perform one or more of the steps of the methods described herein.

FIG. 12 is an example method 1200 to perform sensing, based on the examples described herein. At 1210, the method includes determining whether a resource pool of a group of time slots associated with a first carrier spacing overlaps with a resource pool of a frame associated with a second carrier spacing within a period of time. At 1220, the method includes wherein the first carrier spacing has a higher frequency than the second carrier spacing, and the period of time comprises the group of time slots associated with the first carrier spacing and the frame associated with the second carrier spacing. At 1230, the method includes performing sensing of at least one time slot of the group of time slots, based on whether the resource pool of the group of time slots associated with the first carrier spacing overlaps with the resource pool of the frame associated with the second carrier spacing within the period of time. Method 1200 may be performed with UE 110, SL Tx 110-1, or apparatus 1000.

FIG. 13 is an example method 1300 to perform grouping or aggregation, based on the examples described herein. At 1310, the method includes selecting, from a candidate resource set comprising a set of at least one group of time slots, a group of time slots of the candidate resource set. At 1320, the method includes wherein time slots of the group are contiguous. At 1330, the method includes wherein the group of time slots is associated with a first carrier spacing and overlaps a frame associated with a second carrier spacing. At 1340, the method includes wherein the first carrier spacing has a higher frequency than the second carrier spacing. At 1350, the method includes determining whether to transmit in a first time slot of the group, or to transmit in the first time slot of the group and at least one other time slot of the group starting with the first time slot. Method 1300 may be performed with UE 110, SL Tx 110-1, or apparatus 1000.

FIG. 14 is an example method 1400 to generate a candidate resource set, based on the examples described herein. At 1410, the method includes determining whether a first time slot of a group of time slots is valid for use as a candidate resource. At 1420, the method includes wherein the time slots of the group of time slots are contiguous, and the group of time slots is associated with a first carrier spacing and overlap a frame associated with second carrier spacing. At 1430, the method includes including the first time slot and the other time slots of the group of time slots within a candidate resource set, when the first time slot is determined to be valid for use as a candidate resource. At 1440, the method includes excluding the first time slot and the other time slots of the group of time slots from the candidate resource set, when the first time slot is determined to not be valid for use as a candidate resource. Method 1400 may be performed with UE 110, SL Tx 110-1, or apparatus 1000.

FIG. 15 is an example method 1500 to implement a procedure of a receiver, based on the examples described herein. At 1510, the method includes receiving a transmission in a first time slot of a group of time slots associated with a first carrier spacing, or receive a transmission in the first time slot of the group and at least one other time slot of the group starting with the first time slot. At 1520, the method includes wherein the first time slot and the at least one other time slot are contiguous. At 1530, the method includes wherein the first time slot is aligned with a start of the frame associated with a second carrier spacing, and the group of time slots overlaps the frame associated with the second carrier spacing. At 1540, the method includes wherein the first carrier spacing has a higher frequency than the second carrier spacing. Method 1500 may be performed with UE 110, SL Rx 110-2, or apparatus 1000.

The following examples are provided and described herein.

Example 1. An apparatus comprising: at least one processor; and at least one memory storing instructions that, when executed by the at least one processor, cause the apparatus at least to: determine whether a resource pool of a group of time slots associated with a first carrier spacing overlaps with a resource pool of a frame associated with a second carrier spacing within a period of time; wherein the first carrier spacing has a higher frequency than the second carrier spacing, and the period of time comprises the group of time slots associated with the first carrier spacing and the frame associated with the second carrier spacing; and perform sensing of at least one time slot of the group of time slots, based on whether the resource pool of the group of time slots associated with the first carrier spacing overlaps with the resource pool of the frame associated with the second carrier spacing within the period of time.

Example 2. The apparatus of example 1, wherein the first carrier spacing is associated with a first radio access technology, and the second carrier spacing is associated with a second radio access technology.

Example 3. The apparatus of example 2, wherein the first radio access technology comprises new radio (NR), and the second radio access technology comprises long term evolution (LTE).

Example 4. The apparatus of any of examples 1 to 3, wherein the instructions, when executed by the at least one processor, cause the apparatus to: perform sensing of a first time slot of the group of time slots without performing sensing of other time slots of the group of time slots, when there is overlap; and perform sensing of the first time slot of the group of time slots and perform sensing of the other time slots of the group of time slots, when there is no overlap.

Example 5. The apparatus of any of examples 1 to 4, wherein the instructions, when executed by the at least one processor, cause the apparatus to: determine whether the apparatus is able to perform sensing of a first time slot of the group of time slots; perform sensing of the first time slot of the group of time slots without performing sensing of other time slots of the group of time slots, when there is overlap and the first time slot is able to be sensed; and perform sensing of the first time slot of the group of time slots and perform sensing of the other time slots of the group of time slots, when there is no overlap and the first time slot is able to be sensed.

Example 6. The apparatus of any of examples 1 to 5, wherein the sensing is performed to obtain information related to at least one resource configured for at least one sidelink transmitter.

Example 7. The apparatus of any of examples 1 to 6, wherein a user equipment transmitting with the first carrier spacing is not allowed to begin transmission in a slot not aligned with a start of the frame associated with the second carrier spacing.

Example 8. The apparatus of any of examples 1 to 7, wherein the time slots of the group of time slots are contiguous, and the group of time slots overlap the frame associated with the second carrier spacing.

Example 9. The apparatus of example 8, wherein the instructions, when executed by the at least one processor, cause the apparatus to: determine whether a first time slot is valid for use as a candidate resource; include the first time slot and other time slots of the group of time slots within a candidate resource set, when the first time slot is determined to be valid for use as a candidate resource; and exclude the first time slot and the other time slots of the group of time slots from the candidate resource set, when the first time slot is determined to not be valid for use as a candidate resource.

Example 10. The apparatus of example 9, wherein the instructions, when executed by the at least one processor, cause the apparatus to: provide the candidate resource set to a medium access control layer; wherein the medium access control layer interprets the group of time slots as one member of the candidate resource set, rather than interpreting a time slot of the group of time slots as one member of the candidate resource set; wherein the candidate resource set is determined at a physical layer.

Example 11. The apparatus of example 10, wherein the instructions, when executed by the at least one processor, cause the apparatus to: select, with the medium access control layer, at least one member of the candidate resource set for transmission; wherein the selection is performed randomly; wherein the selection is performed uniformly relative to other selections of at least one member of a different candidate resource set; and perform a sidelink transmission with use of the selected at least one member of the candidate resource set.

Example 12. The apparatus of any of examples 10 to 11, wherein the instructions, when executed by the at least one processor, cause the apparatus to: determine, with the medium access control layer, whether to transmit in a first time slot of the group, or to transmit in the first time slot of the group and the other time slots of the group that are contiguous starting with the first time slot.

Example 13. The apparatus of any of examples 1, to 12 wherein the instructions, when executed by the at least one processor, cause the apparatus to: determine to transmit in a first time slot of the group, or to transmit in the first time slot of the group and at least one other time slot of the group starting with the first time slot; wherein at least one time slot of the group is not used for transmission; and perform sensing in the at least one time slot of the group not used for transmission.

Example 14. The apparatus of any of examples 1 to 13, wherein the instructions, when executed by the at least one processor, cause the apparatus to: determine to transmit in a first time slot of the group without transmitting in other time slots of the group; and perform sensing to determine whether periodic transmissions are taking place in at least one resource related to the other time slots of the group.

Example 15. The apparatus of example 14, wherein the determining to transmit in the first time slot of the group without transmitting in the other time slots of the group is in response to at least one of: lack of feedback from a physical sidelink feedback channel; or detecting that at least one physical sidelink feedback channel resource mapped to a selected resource is being used, and without having requested feedback from a physical sidelink feedback channel.

Example 16. The apparatus of any of examples 1 to 15, wherein the instructions, when executed by the at least one processor, cause the apparatus to: determine to transmit in multiple slots of the group; and decrease a transmission power per slot of the multiple slots.

Example 17. The apparatus of example 16, wherein the determining to transmit in multiple slots of the group is performed in response to at least one of: lack of feedback from a physical sidelink feedback channel; or detecting that at least one physical sidelink feedback channel resource mapped to a selected resource is being used, and without having requested feedback from a physical sidelink feedback channel.

Example 18. The apparatus of any of examples 16 to 17, wherein reduced transmission power is recovered based on soft combining the multiple transmissions.

Example 19. The apparatus of any of examples 16 to 18, wherein the instructions, when executed by the at least one processor, cause the apparatus at least to: apply a common transmission density to the slots of the group.

Example 20. The apparatus of any of examples 1 to 19, wherein: transmission across multiple slots of the group comprises use of a common transport block or use of multiple transport blocks; and a slot transmission comprises data, first stage sidelink control information associated with a physical sidelink control channel, and second stage sidelink control information associated with a physical sidelink shared channel; wherein the first stage sidelink control information of the multiple slots permits the apparatus, when sensing any of the multiple slots, to determine whether any of an aggregation of slots is a valid resource to allow inclusion or exclusion of the valid resource during a resource selection procedure.

Example 21. The apparatus of any of examples 1 to 20, wherein the instructions, when executed by the at least one processor, cause the apparatus at least to: determine whether the apparatus is able to perform sensing of a first time slot of the group of time slots; perform sensing of at least one other time slot of the group of time slots, when the apparatus is not able to perform sensing of the first time slot of the group of time slots; wherein the apparatus is not able to perform sensing of the first time slot of the group of time slots due to at least one of: the apparatus transmitting in the first time slot, the apparatus operating over an air interface, or the apparatus being interrupted with an internal prioritization.

Example 22. The apparatus of example 21, wherein the instructions, when executed by the at least one processor, cause the apparatus at least to: determine whether the at least one other time slot is valid for use as a candidate resource; include the at least one other time slot and the other time slots of the group of time slots within a candidate resource set, when the at least one other time slot is determined to be valid for use as a candidate resource; and exclude the at least one other time slot and the other time slots of the group of time slots from the candidate resource set, when the at least one other time slot is determined to not be valid for use as a candidate resource.

Example 23. The apparatus of any of examples 21 to 22, wherein the instructions, when executed by the at least one processor, cause the apparatus to: consider the first time slot as non-monitored, when the apparatus is allowed to transmit in a subset of the group of slots; and consider the first time slot as monitored, when the apparatus is not allowed to transmit in the first time slot.

Example 24. An apparatus comprising: at least one processor; and at least one memory storing instructions that, when executed by the at least one processor, cause the apparatus at least to: select, from a candidate resource set comprising a set of at least one group of time slots, a group of time slots of the candidate resource set; wherein time slots of the group are contiguous; wherein the group of time slots is associated with a first carrier spacing and overlaps a frame associated with a second carrier spacing; wherein the first carrier spacing has a higher frequency than the second carrier spacing; and determine whether to transmit in a first time slot of the group, or to transmit in the first time slot of the group and at least one other time slot of the group starting with the first time slot.

Example 25. The apparatus of example 24, wherein the first carrier spacing is associated with a first radio access technology, and the second carrier spacing is associated with a second radio access technology.

Example 26. The apparatus of example 25, wherein the first radio access technology comprises new radio (NR), and the second radio access technology comprises long term evolution (LTE).

Example 27. The apparatus of any of examples 24 to 26, wherein the instructions, when executed by the at least one processor, cause the apparatus at least to: determine to transmit in the first time slot of the group and the other time slots of the group starting with the first time slot.

Example 28. The apparatus of any of examples 24 to 27, wherein: transmission across multiple slots of the group comprises use of a common transport block or use of multiple transport blocks; and a slot transmission comprises data, first stage sidelink control information associated with a physical sidelink control channel, and second stage sidelink control information associated with a physical sidelink shared channel; wherein the first stage sidelink control information of the multiple slots permits the apparatus, when sensing any of the multiple slots, to determine whether any of an aggregation of slots is a valid resource to allow inclusion or exclusion of the valid resource during a resource selection procedure.

Example 29. The apparatus of any of examples 24 to 28, wherein the instructions, when executed by the at least one processor, cause the apparatus to: determine to transmit in the first time slot of the group, or to transmit in the first time slot of the group and at least one other time slot of the group starting with the first time slot; wherein at least one time slot of the group is not used for transmission; and perform sensing in the at least one time slot of the group not used for transmission.

Example 30. The apparatus of any of examples 24 to 29, wherein the instructions, when executed by the at least one processor, cause the apparatus to: determine to transmit in the first time slot of the group without transmitting in the other time slots of the group; and perform sensing to determine whether periodic transmissions are taking place in at least one resource related to the other time slots of the group; wherein the determining to transmit in the first time slot of the group without transmitting in the other time slots of the group is in response to at least one of: lack of feedback from a physical sidelink feedback channel; or detecting that at least one physical sidelink feedback channel resource mapped to a selected resource is being used, and without having requested feedback from a physical sidelink feedback channel.

Example 31. The apparatus of any of examples 24 to 30, wherein the instructions, when executed by the at least one processor, cause the apparatus to: determine to transmit in multiple slots of the group; and decrease a transmission power per slot of the multiple slots; wherein the determining to transmit in multiple slots of the group is performed in response to at least one of: lack of feedback from a physical sidelink feedback channel; or detecting that at least one physical sidelink feedback channel resource mapped to a selected resource is being used, and without having requested feedback from a physical sidelink feedback channel.

Example 32. The apparatus of example 31, wherein reduced transmission power is recovered based on soft combining the multiple transmissions.

Example 33. The apparatus of any of examples 31 to 32, wherein the instructions, when executed by the at least one processor, cause the apparatus at least to: apply a common transmission density to the slots of the group.

Example 34. The apparatus of any of examples 24 to 33, wherein the instructions, when executed by the at least one processor, cause the apparatus at least to: determine whether a resource pool of the group overlaps with a resource pool of the frame associated with a second carrier spacing within a period of time; wherein the period of time comprises the group of time slots associated with the first carrier spacing and the frame associated with the second carrier spacing; perform sensing of the first time slot of the group of time slots without performing sensing of other time slots of the group of time slots, when there is overlap; and perform sensing of the first time slot of the group of time slots and perform sensing of the other time slots of the group of time slots, when there is no overlap.

Example 35. The apparatus of example 34, wherein the instructions, when executed by the at least one processor, cause the apparatus at least to: determine whether the apparatus is able to perform sensing of a first time slot of the group of time slots; perform sensing of the first time slot of the group of time slots without performing sensing of other time slots of the group of time slots, when there is overlap and the first time slot is able to be sensed; and perform sensing of the first time slot of the group of time slots and perform sensing of the other time slots of the group of time slots, when there is no overlap and the first time slot is able to be sensed.

Example 36. The apparatus of any of examples 24 to 35, wherein the instructions, when executed by the at least one processor, cause the apparatus at least to: determine whether the apparatus is able to perform sensing of the first time slot of the group of time slots; perform sensing of at least one other time slot of the group of time slots, when the apparatus is not able to perform sensing of the first time slot of the group of time slots; wherein the apparatus is not able to perform sensing of the first time slot of the group of time slots due to at least one of: the apparatus transmitting in the first time slot, the apparatus operating over an air interface, or the apparatus being interrupted with an internal prioritization.

Example 37. The apparatus of any of examples 24 to 36, wherein the instructions, when executed by the at least one processor, cause the apparatus to: determine whether the first time slot is valid for use as a candidate resource; include the first time slot and the other time slots of the group of time slots within the candidate resource set, when the first time slot is determined to be valid for use as a candidate resource; and exclude the first time slot and the other time slots of the group of time slots from the candidate resource set, when the first time slot is determined to not be valid for use as a candidate resource.

Example 38. An apparatus comprising: at least one processor; and at least one memory storing instructions that, when executed by the at least one processor, cause the apparatus at least to: determine whether a first time slot of a group of time slots is valid for use as a candidate resource; wherein the time slots of the group of time slots are contiguous, and the group of time slots is associated with a first carrier spacing and overlap a frame associated with second carrier spacing; include the first time slot and the other time slots of the group of time slots within a candidate resource set, when the first time slot is determined to be valid for use as a candidate resource; and exclude the first time slot and the other time slots of the group of time slots from the candidate resource set, when the first time slot is determined to not be valid for use as a candidate resource.

Example 39. The apparatus of example 38, wherein the first carrier spacing is associated with a first radio access technology, and the second carrier spacing is associated with a second radio access technology.

Example 40. The apparatus of example 39, wherein the first radio access technology comprises new radio (NR), and the second radio access technology comprises long term evolution (LTE).

Example 41. The apparatus of any of examples 38 to 40, wherein the instructions, when executed by the at least one processor, cause the apparatus to: provide the candidate resource set to a medium access control layer; wherein the medium access control layer interprets the group of time slots as one member of the candidate resource set, rather than interpreting a time slot of the group of time slots as one member of the candidate resource set; wherein the candidate resource set is determined at a physical layer.

Example 42. The apparatus of any of examples 38 to 41, wherein the instructions, when executed by the at least one processor, cause the apparatus to: select, at the medium access control layer, at least one member of the candidate resource set for transmission; wherein the selection is performed randomly; wherein the selection is performed uniformly relative to other selections of at least one member of a different candidate resource set; and perform a sidelink transmission with use of the selected at least one member of the candidate resource set.

Example 43. An apparatus comprising: at least one processor; and at least one memory storing instructions that, when executed by the at least one processor, cause the apparatus at least to: receive a transmission in a first time slot of a group of time slots associated with a first carrier spacing, or receive a transmission in the first time slot of the group and at least one other time slot of the group starting with the first time slot; wherein the first time slot and the at least one other time slot are contiguous; wherein the first time slot is aligned with a start of the frame associated with a second carrier spacing, and the group of time slots overlaps the frame associated with the second carrier spacing; wherein the first carrier spacing has a higher frequency than the second carrier spacing.

Example 44. The apparatus of example 43, wherein the first carrier spacing is associated with a first radio access technology, and the second carrier spacing is associated with a second radio access technology.

Example 45. The apparatus of example 44, wherein the first radio access technology comprises new radio (NR), and the second radio access technology comprises long term evolution (LTE).

Example 46. The apparatus of any of examples 43 to 45, wherein the instructions, when executed by the at least one processor, cause the apparatus at least to: recover reduced transmission power based on soft combining multiple transmissions, when multiple transmission are received.

Example 47. The apparatus of any of examples 43 to 46, wherein the apparatus comprises a user equipment, and the transmission is received from another user equipment.

Example 48. The apparatus of any of examples 43 to 47, wherein a transmission is not received in at least one time slot of the group.

Example 49. The apparatus of any of examples 43 to 48, wherein: receipt of transmission across multiple slots of the group comprises use of a common transport block or use of multiple transport blocks; and a slot transmission comprises data, first stage sidelink control information associated with a physical sidelink control channel, and second stage sidelink control information associated with a physical sidelink shared channel.

Example 50. The apparatus of any of examples 43 to 49, wherein the instructions, when executed by the at least one processor, cause the apparatus at least to: apply an analog gain control gain for a duration of the frame associated with the second carrier spacing.

Example 51. The apparatus of any of examples 43 to 51, wherein a transmission is not received in a slot not aligned with a start of the frame associated with the second carrier spacing.

Example 52. A method comprising: determining whether a resource pool of a group of time slots associated with a first carrier spacing overlaps with a resource pool of a frame associated with a second carrier spacing within a period of time; wherein the first carrier spacing has a higher frequency than the second carrier spacing, and the period of time comprises the group of time slots associated with the first carrier spacing and the frame associated with the second carrier spacing; and performing sensing of at least one time slot of the group of time slots, based on whether the resource pool of the group of time slots associated with the first carrier spacing overlaps with the resource pool of the frame associated with the second carrier spacing within the period of time.

Example 53. A method comprising: selecting, from a candidate resource set comprising a set of at least one group of time slots, a group of time slots of the candidate resource set; wherein time slots of the group are contiguous; wherein the group of time slots is associated with a first carrier spacing and overlaps a frame associated with a second carrier spacing; wherein the first carrier spacing has a higher frequency than the second carrier spacing; and determining whether to transmit in a first time slot of the group, or to transmit in the first time slot of the group and at least one other time slot of the group starting with the first time slot.

Example 54. A method comprising: determining whether a first time slot of a group of time slots is valid for use as a candidate resource; wherein the time slots of the group of time slots are contiguous, and the group of time slots is associated with a first carrier spacing and overlap a frame associated with second carrier spacing; including the first time slot and the other time slots of the group of time slots within a candidate resource set, when the first time slot is determined to be valid for use as a candidate resource; and excluding the first time slot and the other time slots of the group of time slots from the candidate resource set, when the first time slot is determined to not be valid for use as a candidate resource.

Example 55. A method comprising: receiving a transmission in a first time slot of a group of time slots associated with a first carrier spacing, or receive a transmission in the first time slot of the group and at least one other time slot of the group starting with the first time slot; wherein the first time slot and the at least one other time slot are contiguous; wherein the first time slot is aligned with a start of the frame associated with a second carrier spacing, and the group of time slots overlaps the frame associated with the second carrier spacing; wherein the first carrier spacing has a higher frequency than the second carrier spacing.

Example 56. An apparatus comprising: means for determining whether a resource pool of a group of time slots associated with a first carrier spacing overlaps with a resource pool of a frame associated with a second carrier spacing within a period of time; wherein the first carrier spacing has a higher frequency than the second carrier spacing, and the period of time comprises the group of time slots associated with the first carrier spacing and the frame associated with the second carrier spacing; and means for performing sensing of at least one time slot of the group of time slots, based on whether the resource pool of the group of time slots associated with the first carrier spacing overlaps with the resource pool of the frame associated with the second carrier spacing within the period of time.

Example 57. An apparatus comprising: means for selecting, from a candidate resource set comprising a set of at least one group of time slots, a group of time slots of the candidate resource set; wherein time slots of the group are contiguous; wherein the group of time slots is associated with a first carrier spacing and overlaps a frame associated with a second carrier spacing; wherein the first carrier spacing has a higher frequency than the second carrier spacing; and means for determining whether to transmit in a first time slot of the group, or to transmit in the first time slot of the group and at least one other time slot of the group starting with the first time slot.

Example 58. An apparatus comprising: means for determining whether a first time slot of a group of time slots is valid for use as a candidate resource; wherein the time slots of the group of time slots are contiguous, and the group of time slots is associated with a first carrier spacing and overlap a frame associated with second carrier spacing; means for including the first time slot and the other time slots of the group of time slots within a candidate resource set, when the first time slot is determined to be valid for use as a candidate resource; and means for excluding the first time slot and the other time slots of the group of time slots from the candidate resource set, when the first time slot is determined to not be valid for use as a candidate resource.

Example 59. An apparatus comprising: means for receiving a transmission in a first time slot of a group of time slots associated with a first carrier spacing, or receive a transmission in the first time slot of the group and at least one other time slot of the group starting with the first time slot; wherein the first time slot and the at least one other time slot are contiguous; wherein the first time slot is aligned with a start of the frame associated with a second carrier spacing, and the group of time slots overlaps the frame associated with the second carrier spacing; wherein the first carrier spacing has a higher frequency than the second carrier spacing.

Example 60. A non-transitory program storage device readable by a machine, tangibly embodying a program of instructions executable by the machine for performing operations, the operations comprising: determining whether a resource pool of a group of time slots associated with a first carrier spacing overlaps with a resource pool of a frame associated with a second carrier spacing within a period of time; wherein the first carrier spacing has a higher frequency than the second carrier spacing, and the period of time comprises the group of time slots associated with the first carrier spacing and the frame associated with the second carrier spacing; and performing sensing of at least one time slot of the group of time slots, based on whether the resource pool of the group of time slots associated with the first carrier spacing overlaps with the resource pool of the frame associated with the second carrier spacing within the period of time.

Example 61. A non-transitory program storage device readable by a machine, tangibly embodying a program of instructions executable by the machine for performing operations, the operations comprising: selecting, from a candidate resource set comprising a set of at least one group of time slots, a group of time slots of the candidate resource set; wherein time slots of the group are contiguous; wherein the group of time slots is associated with a first carrier spacing and overlaps a frame associated with a second carrier spacing; wherein the first carrier spacing has a higher frequency than the second carrier spacing; and determining whether to transmit in a first time slot of the group, or to transmit in the first time slot of the group and at least one other time slot of the group starting with the first time slot.

Example 62. A non-transitory program storage device readable by a machine, tangibly embodying a program of instructions executable by the machine for performing operations, the operations comprising: determining whether a first time slot of a group of time slots is valid for use as a candidate resource; wherein the time slots of the group of time slots are contiguous, and the group of time slots is associated with a first carrier spacing and overlap a frame associated with second carrier spacing; including the first time slot and the other time slots of the group of time slots within a candidate resource set, when the first time slot is determined to be valid for use as a candidate resource; and excluding the first time slot and the other time slots of the group of time slots from the candidate resource set, when the first time slot is determined to not be valid for use as a candidate resource.

Example 63. A non-transitory program storage device readable by a machine, tangibly embodying a program of instructions executable by the machine for performing operations, the operations comprising: receiving a transmission in a first time slot of a group of time slots associated with a first carrier spacing, or receive a transmission in the first time slot of the group and at least one other time slot of the group starting with the first time slot;

wherein the first time slot and the at least one other time slot are contiguous; wherein the first time slot is aligned with a start of the frame associated with a second carrier spacing, and the group of time slots overlaps the frame associated with the second carrier spacing; wherein the first carrier spacing has a higher frequency than the second carrier spacing.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In the figures, lines and arrows between individual blocks represent operational couplings there-between, and arrows represent the direction of data flows on those couplings.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, or number):

3GPP third generation partnership project
4G fourth generation 5G fifth generation
5GC 5G core network
ADC analog to digital converter
AGC analog gain control
AMF access and mobility management function
ASIC application-specific integrated circuit
BSM basic safety message
CAM cooperative awareness message
CD compact/computer disc
CPU central processing unit
CU central unit or centralized unit
DMRS demodulation reference signal
DRX discontinuous reception
DSP digital signal processor
DVD digital versatile disc
eNB evolved Node B (e.g., an LTE base station)
EN-DC E-UTRAN new radio—dual connectivity
en-gNB node providing NR user plane and control plane
    protocol terminations towards the UE, and acting as a
    secondary node in EN-DC
E-UTRA evolved universal terrestrial radio access, i.e.,
    the LTE radio access technology
E-UTRAN E-UTRA network
F1 interface between the CU and the DU
FFS for further study
FPGA field-programmable gate array
gNB base station for 5G/NR, i.e., a node providing NR
    user plane and control plane protocol terminations
    towards the UE, and connected via the NG interface to
    the 5GC
IAB integrated access and backhaul
I/F interface
I/O input/output
LMF location management function
LTE long term evolution (4G)
MAC medium access control
MCS modulation and coding scheme
MME mobility management entity
MRO mobility robustness optimization
NCE network control element
ng or NG new generation
ng-eNB new generation eNB
NG-RAN new generation radio access network
NR new radio
N/W network
NW network
OFDM orthogonal frequency division multiplexing
PDA personal digital assistant
PDCP packet data convergence protocol
PHY physical layer
PSCCH physical sidelink control channel
PSFCH physical sidelink feedback channel
PSSCH physical sidelink shared channel
QAM quadrature amplitude modulation
QPSK quadrature phase-shift keying
RAM random access memory
RAN radio access network
RAN1 radio layer 1
RAN2 radio layer 2
RAN4 RAN WG4
RAT radio access technology
RB resource block
Rel release
RLC radio link control
ROM read-only memory
RP RAN meeting
RRC radio resource control RSRP reference signal received power
RU radio unit
Rx or RX receiver or reception
SA scheduling assignment
SC-FDMA single carrier frequency division multiple access
SCI sidelink control information
SCS subcarrier spacing
SGW serving gateway
SL sidelink
SMF session management function
SON self-organizing/optimizing network
SR scheduling request
TB transport block
TRP transmission reception point
TS technical specification
Tx or TX transmitter or transmission
UAV unmanned aerial vehicle
UE user equipment (e.g., a wireless, typically mobile device)
UI user interface
UMTS universal mobile telecommunications system
UPF user plane function
USB universal serial bus
UTRAN UMTS terrestrial radio access network
Uu UMTS air interface
V2X vehicle to everything
WG working group
WID work item description
X2 network interface between RAN nodes and between RAN and the core network
Xn network interface between NG-RAN nodes

What is claimed is:

1. An apparatus comprising:
at least one processor; and
at least one memory storing instructions that, when executed by the at least one processor, cause the apparatus at least to:
determine whether a resource pool of a group of time slots associated with a first carrier spacing overlaps with a resource pool of a frame associated with a second carrier spacing within a period of time;
wherein the first carrier spacing has a higher frequency than the second carrier spacing, and the period of time comprises the group of time slots associated with the first carrier spacing and the frame associated with the second carrier spacing;
perform sensing of at least one time slot of the group of time slots, based on whether the resource pool of the group of time slots associated with the first carrier spacing overlaps with the resource pool of the frame associated with the second carrier spacing within the period of time;
perform sensing of a first time slot of the group of time slots of the resource pool associated with the first carrier spacing and not perform sensing of any other time slot of the group of time slots associated with the first carrier spacing other than the first time slot, when each of the time slots of the group of time slots of the resource pool associated with the first carrier spacing overlaps in time with the resource pool of the frame associated with the second carrier spacing; and
perform sensing of the first time slot of the group of time slots of the resource pool associated with the first carrier spacing and perform sensing of each of the other time slots of the group of time slots associated with the first carrier spacing other than the first time slot, when none of the time slots of the group of time slots of the resource pool associated with the first carrier spacing overlap in time with the resource pool of the frame associated with the second carrier spacing.

2. The apparatus of claim 1, wherein the first carrier spacing is associated with a first radio access technology, and the second carrier spacing is associated with a second radio access technology.

3. The apparatus of claim 2, wherein the first radio access technology comprises new radio (NR), and the second radio access technology comprises long term evolution (LTE).

4. The apparatus of claim 1, wherein the instructions, when executed by the at least one processor, cause the apparatus to:
determine whether the apparatus is able to perform sensing of the first time slot of the group of time slots;
perform sensing of the first time slot of the group of time slots without performing sensing of other time slots of the group of time slots, when there is overlap and the first time slot is able to be sensed; and
perform sensing of the first time slot of the group of time slots and perform sensing of the other time slots of the group of time slots, when there is no overlap and the first time slot is able to be sensed.

5. The apparatus of claim 1, wherein the sensing is performed to obtain information related to at least one resource configured for at least one sidelink transmitter.

6. The apparatus of claim 1, wherein a user equipment transmitting with the first carrier spacing is not allowed to begin transmission in a slot not aligned with a start of the frame associated with the second carrier spacing.

7. The apparatus of claim 1, wherein the instructions, when executed by the at least one processor, cause the apparatus to:
determine to transmit in the first time slot of the group, or to transmit in the first time slot of the group and at least one other time slot of the group starting with the first time slot;
wherein at least one time slot of the group is not used for transmission; and
perform sensing in the at least one time slot of the group not used for transmission.

8. The apparatus of claim 1, wherein:
transmission across multiple slots of the group comprises use of a common transport block or use of multiple transport blocks; and
a slot transmission comprises data, first stage sidelink control information associated with a physical sidelink control channel, and second stage sidelink control information associated with a physical sidelink shared channel;
wherein the first stage sidelink control information of the multiple slots permits the apparatus, when sensing any of the multiple slots, to determine whether any of an aggregation of slots is a valid resource to allow inclusion or exclusion of the valid resource during a resource selection procedure.

9. The apparatus of claim 1, wherein the at least one memory stores instructions that, when executed by the at least one processor, cause the apparatus at least to:
determine that the first time slot of the group of time slots of the resource pool associated with the first carrier spacing is valid for use as a candidate resource of a candidate resource set, determine to include the first time slot of the group of time slots of the resource pool associated with the first carrier spacing within the candidate resource set as the candidate resource, and determine to include of each of the other time slots of the group of time slots associated with the first carrier spacing other than the first time slot within the candidate resource set as candidate resources.

10. The apparatus of claim 1, wherein the at least one memory stores instructions that, when executed by the at least one processor, cause the apparatus at least to:

determine that the first time slot of the group of time slots of the resource pool associated with the first carrier spacing is not valid for use as a candidate resource of a candidate resource set, determine to exclude the first time slot of the group of time slots of the resource pool associated with the first carrier spacing within the candidate resource set as the candidate resource, and determine to exclude of each of the other time slots of the group of time slots associated with the first carrier spacing other than the first time slot within the candidate resource set as candidate resources.

11. The apparatus of claim 1, wherein the at least one memory stores instructions that, when executed by the at least one processor, cause the apparatus at least to:

determine that the first time slot of the group of time slots of the resource pool associated with the first carrier spacing is unable to be sensed, and perform sensing of at least one time slot of the group of time slots of the resource pool associated with the first carrier spacing other than the first time slot to acquire information for determining whether the group of time slots of the resource pool associated with the first carrier spacing is valid.

12. A method comprising:

determining whether a resource pool of a group of time slots associated with a first carrier spacing overlaps with a resource pool of a frame associated with a second carrier spacing within a period of time;

wherein the first carrier spacing has a higher frequency than the second carrier spacing, and the period of time comprises the group of time slots associated with the first carrier spacing and the frame associated with the second carrier spacing;

performing sensing of at least one time slot of the group of time slots, based on whether the resource pool of the group of time slots associated with the first carrier spacing overlaps with the resource pool of the frame associated with the second carrier spacing within the period of time;

performing sensing of a first time slot of the group of time slots of the resource pool associated with the first carrier spacing and not performing sensing of any other time slot of the group of time slots associated with the first carrier spacing other than the first time slot, when each of the time slots of the group of time slots of the resource pool associated with the first carrier spacing overlaps in time with the resource pool of the frame associated with the second carrier spacing; and performing sensing of the first time slot of the group of time slots of the resource pool associated with the first carrier spacing and performing sensing of each of the other time slots of the group of time slots associated with the first carrier spacing other than the first time slot, when none of the time slots of the group of time slots of the resource pool associated with the first carrier spacing overlap in time with the resource pool of the frame associated with the second carrier spacing.

13. A non-transitory program storage device readable by a machine, tangibly embodying a program of instructions executable by the machine for performing operations, the operations comprising:

determining whether a resource pool of a group of time slots associated with a first carrier spacing overlaps with a resource pool of a frame associated with a second carrier spacing within a period of time;

wherein the first carrier spacing has a higher frequency than the second carrier spacing, and the period of time comprises the group of time slots associated with the first carrier spacing and the frame associated with the second carrier spacing;

performing sensing of at least one time slot of the group of time slots, based on whether the resource pool of the group of time slots associated with the first carrier spacing overlaps with the resource pool of the frame associated with the second carrier spacing within the period of time;

performing sensing of a first time slot of the group of time slots of the resource pool associated with the first carrier spacing and not performing sensing of any other time slot of the group of time slots associated with the first carrier spacing other than the first time slot, when each of the time slots of the group of time slots of the resource pool associated with the first carrier spacing overlaps in time with the resource pool of the frame associated with the second carrier spacing; and performing sensing of the first time slot of the group of time slots of the resource pool associated with the first carrier spacing and performing sensing of each of the other time slots of the group of time slots associated with the first carrier spacing other than the first time slot, when none of the time slots of the group of time slots of the resource pool associated with the first carrier spacing overlap in time with the resource pool of the frame associated with the second carrier spacing.

\* \* \* \* \*